(12) United States Patent
Shishikura

(10) Patent No.: US 7,384,081 B2
(45) Date of Patent: Jun. 10, 2008

(54) POSITIONING JIG FOR VEHICULAR-PART MOUNTING HOLE

(75) Inventor: Yasuyuki Shishikura, Niiza (JP)

(73) Assignee: Honda Access Corporation, Niza-Shi (JP)

( * ) Notice: Subject to any disclaimer, the term of this patent is extended or adjusted under 35 U.S.C. 154(b) by 174 days.

(21) Appl. No.: 11/311,286

(22) Filed: Dec. 20, 2005

(65) Prior Publication Data

US 2006/0137162 A1 Jun. 29, 2006

(30) Foreign Application Priority Data

Dec. 28, 2004 (JP) ............................. 2004-379773

(51) Int. Cl.
*B60R 27/00* (2006.01)

(52) U.S. Cl. ............................................ 293/1; 33/600

(58) Field of Classification Search .................... 293/1; 33/1 BB, 562, 563, 600, 613, 645
See application file for complete search history.

(56) References Cited

U.S. PATENT DOCUMENTS

| | | | | |
|---|---|---|---|---|
| 2,895,515 A | * | 7/1959 | Ende ........................ | 83/435.13 |
| 4,291,467 A | * | 9/1981 | Shultz, Jr. .................. | 33/561.2 |
| 4,626,208 A | * | 12/1986 | Hall .............................. | 433/3 |
| 5,318,394 A | | 6/1994 | Pierce et al. | |
| 5,428,900 A | * | 7/1995 | Hambleton ................. | 33/32.7 |
| 5,441,428 A | * | 8/1995 | Hamai et al. ............... | 439/843 |
| 5,491,905 A | * | 2/1996 | Jablonski et al. ............. | 33/613 |
| 6,076,575 A | * | 6/2000 | Harkness .................. | 144/144.1 |
| 6,944,024 B1 | * | 9/2005 | Devine, III .................. | 361/704 |
| 7,077,712 B2 | * | 7/2006 | Sakaguchi et al. .......... | 439/877 |
| 7,237,344 B2 | * | 7/2007 | Shishikura .................... | 33/645 |
| 2001/0049877 A1 | * | 12/2001 | Sato et al. .................... | 29/860 |
| 2002/0195839 A1 | * | 12/2002 | Nishijima .................... | 296/194 |
| 2004/0099684 A1 | | 5/2004 | Day et al. | |
| 2004/0264203 A1 | * | 12/2004 | Konno et al. ............... | 362/465 |
| 2005/0005461 A1 | * | 1/2005 | Rohrig ..................... | 33/203.18 |
| 2005/0257389 A1 | * | 11/2005 | Pierson et al. ................ | 33/194 |
| 2005/0275250 A1 | * | 12/2005 | Wada ..................... | 296/203.02 |
| 2006/0143892 A1 | * | 7/2006 | Shishikura ................. | 29/281.5 |

(Continued)

FOREIGN PATENT DOCUMENTS

DE 20014981 U 1/2001

(Continued)

OTHER PUBLICATIONS

Great Britain Search Report dated Apr. 25, 2006.

*Primary Examiner*—H Gutman
(74) *Attorney, Agent, or Firm*—Westerman, Hattori, Daniels & Adrian, LLP.

(57) ABSTRACT

Extending sections are positioned along X and Y directions by engagement sections, and positioned along Y direction of a vehicle by positioning sections using mounts of a rear bumper. This makes it possible to accurately indicate a forming position of a vehicular-part mounting hole, which is needed to mount a rear under spoiler, with respect to the rear bumper based on a scribed mark if the extending sections are positioned by using the engagement sections and the positioning sections. Therefore, a worker can form a vehicular-part mounting hole in an appropriate position by merely making a hole in the position of the scribed mark, without requiring a work of removing the rear bumper.

17 Claims, 10 Drawing Sheets

U.S. PATENT DOCUMENTS

2007/0175017 A1* 8/2007 Kim .......................... 29/557
2007/0182174 A1* 8/2007 Nakayama et al. ......... 293/115

FOREIGN PATENT DOCUMENTS

| | | |
|---|---|---|
| GB | 698643 | 5/1951 |
| JP | 2-136788 | 11/1990 |
| JP | 6-49231 | 7/1994 |
| JP | 10-249619 | 9/1998 |
| WO | WO 87/04392 | 7/1987 |

\* cited by examiner

POSITIONING JIG FOR VEHICULAR-PART MOUNTING HOLE

BACKGROUND OF THE INVENTION

1. Field of the Invention

The present invention relates to a positioning jig for a vehicular-part mounting hole, and is suitable in forming a vehicular-part mounting hole for mounting vehicular exterior parts, such as a front under spoiler, a rear under spoiler (hereinafter, both simply and generally called "under spoiler"), and a rear spoiler, in the vehicle.

2. Description of the Related Art

Recently, for improving aerodynamic characteristics and design characteristics of a vehicle, an under spoiler is mounted on a front bumper or a rear bumper (hereinafter, simply and generally called "bumper"), and a rear spoiler is mounted on a trunk lid.

To mount a vehicular exterior part, such as an under spoiler or a rear spoiler, mounted on a mounting position such as a bumper or a trunk lid, a bolt is inserted into a mounting hole formed in the vehicular exterior part and a vehicular-part mounting hole formed in the mounting position through a clip nut or the like, and the leading end of the bolt is tightened with a screw nut, thereby mounting the vehicular exterior part on the mounting position (see, for example, Japanese Unexamined Utility Model Publication No. 6-49231, and Japanese Unexamined Utility Model Publication No. 2-136788).

If a vehicular-part mounting hole is provided in the bumper on which the under spoiler as the vehicular exterior part is mounted, at a position corresponding to the mounting hole of the under spoiler beforehand, the vehicular-part mounting hole may be externally visible when the under spoiler is not mounted on, and this results in a poor general appearance in design of the vehicle.

To overcome such a problem, conventionally, a scribed mark for forming is provided beforehand in a position in a bumper corresponding to the mounting hole of the under spoiler, and in the rear face of the bumper that is not externally visible. In actually mounting the under spoiler, the bumper is temporarily removed from a vehicle, forming is performed with a pushpin or the like based on the scribed mark on the rear face, and a vehicular-part mounting hole is formed by a drill or the like based on the hole made by the pushpin or the like.

Accordingly, in a work of mounting an under spoiler to a bumper, the bumper must be removed from a vehicle every time for a worker to check a scribed mark provided on the rear face of the bumper with his/her eyes. Therefore, the mounting work becomes complicated, making a work burden on the worker larger, and takes time.

In a work of mounting a rear spoiler as a vehicular exterior part on a trunk lid, as illustrated in FIG. 17, a paper pattern 101 provided with scribed marks 100 beforehand for drilling is positioned on the top face of a trunk lid 102, the trunk lid 102 is pierced with a pushpin or the like based on the scribed marks 100 positioned over the trunk lid 102, and a vehicular-part mounting hole is formed by a drill or the like.

The paper pattern 101 positioned to the trunk lid 102 is, however, formed in the approximately same size as the top face 103 of the trunk lid 102, and is therefore not easy to handle. Further, positioning all four corners of the paper pattern 101 to the four corners of the trunk lid 102 requires a skill, complicating the mounting work, and making a work burden on the worker larger. When the paper pattern 101 is not accurately positioned to the trunk lid 102, it is necessary to reposition all four corners of the paper pattern 101, and the mounting work takes time.

The present invention has been made in view of the above circumstances, and it is an object of the invention to provide a positioning jig for a vehicular-part mounting hole which can dramatically decrease a work burden when mounting a vehicular part, and considerably reduce the time for the mounting work.

SUMMARY OF THE INVENTION

To achieve the object, according to the first aspect of the invention, a positioning jig for a vehicular-part mounting hole for mounting a vehicular part to a vehicle, comprises: an engagement section which defines a jig main body with respect to the vehicle; an extending section which is so formed as to extend from the jig main body defined by the engagement section toward a mounting position where the vehicular part is to be mounted, and is provided with a forming mark for the vehicular-part mounting hole; and a positioning section which positions the extending section to the vehicle.

The engagement section may define the jig main body with respect to a height direction of the vehicle, and the extending section may be so formed as to extend in a direction approximately orthogonal to the height direction defined by the engagement section.

The extending section may have a second engagement section which defines a position of the extending section with respect to the vehicle.

The aforementioned positioning jig may be formed by folding a tabular member.

The vehicular part may be a rear under spoiler.

The engagement section may be formed in a curved shape concaved from one end of the engagement section to the other end along shapes of back and bottom faces of a rear bumper of the vehicle.

The extending section may have a flat portion, and be formed in such a manner as to extend along the width direction of the vehicle, and the flat portion may closely contact the bottom face of the rear bumper, structurally.

The positioning section may have a step-correction piece that closely contacts a mount portion provided on a bottom face of a rear bumper of the vehicle, and a protrusion piece to be inserted into a bolt-insertion hole in the mount portion.

The positioning section may have a positioning piece that closely contacts a contour of a mount portion provided on a bottom face of a rear bumper of the vehicle.

The positioning section may have a positioning piece that closely contacts a contour of a rib for painting provided on a bottom face of a rear bumper of the vehicle.

The vehicular part may be a rear spoiler.

The engagement section may be formed in an approximately curved shape so as to match with a shape of a trunk lid of the vehicle from a rear face of the trunk lid to a top face thereof.

A foldable engagement piece may be provided on a leading end of the extending section, and be engaged with a side-end portion of a trunk lid of the vehicle.

According to the invention, once the jig main body is positioned to the vehicle with the engagement section and the positioning section, the forming positions of the vehicular-part mounting holes necessary in mounting the vehicular part can be precisely indicated. Therefore, a worker can pierce the vehicular-part mounting holes in appropriate positions by just forming holes in the positions of the scribed marks without requiring any other work. This results in dramatical reduction in a work burden when the vehicular part is mounted, and considerable reduction in the operating time of the mounting work.

BRIEF DESCRIPTION OF THE DRAWINGS

The object, other objects, and advantages of the invention will be more apparent upon reading the following detailed description together with the accompanying drawings in which.

DETAILED DESCRIPTION OF THE PREFERRED EMBODIMENTS

Embodiments of the invention will be described in detail with reference to the accompanying drawings.

First Embodiment

Figure 1:
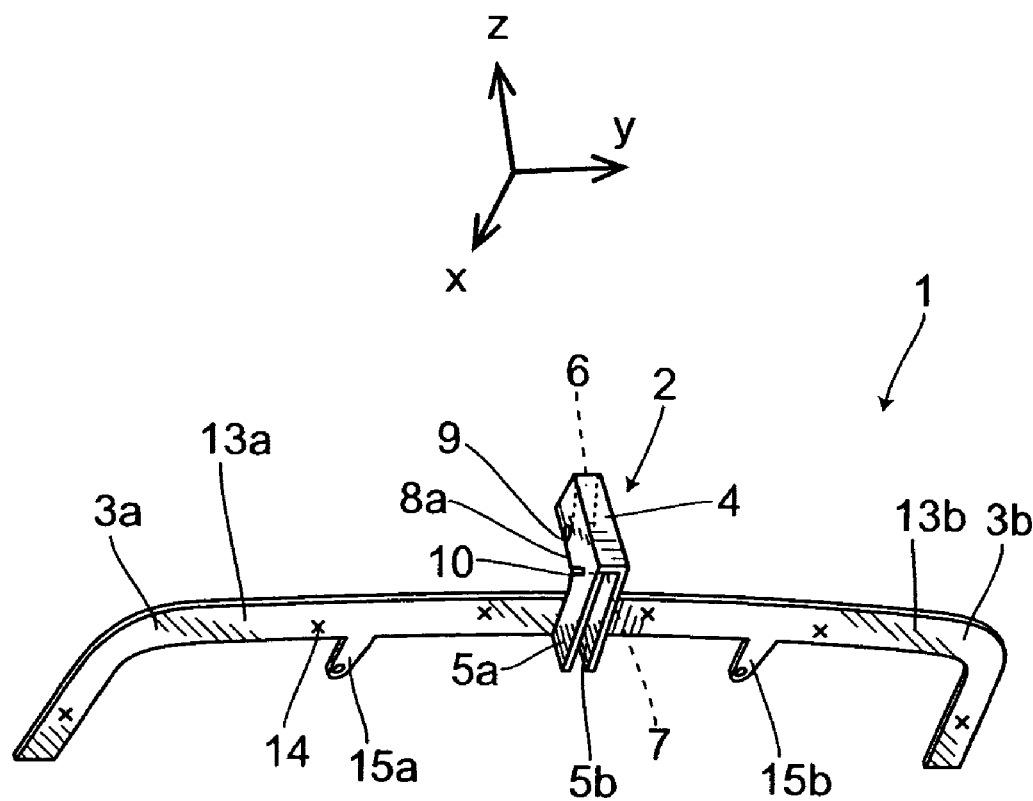
FIG. 1 is a perspective view illustrating the general structure of a positioning jig for a vehicular-part mounting hole according to a first embodiment.
Figure 2:
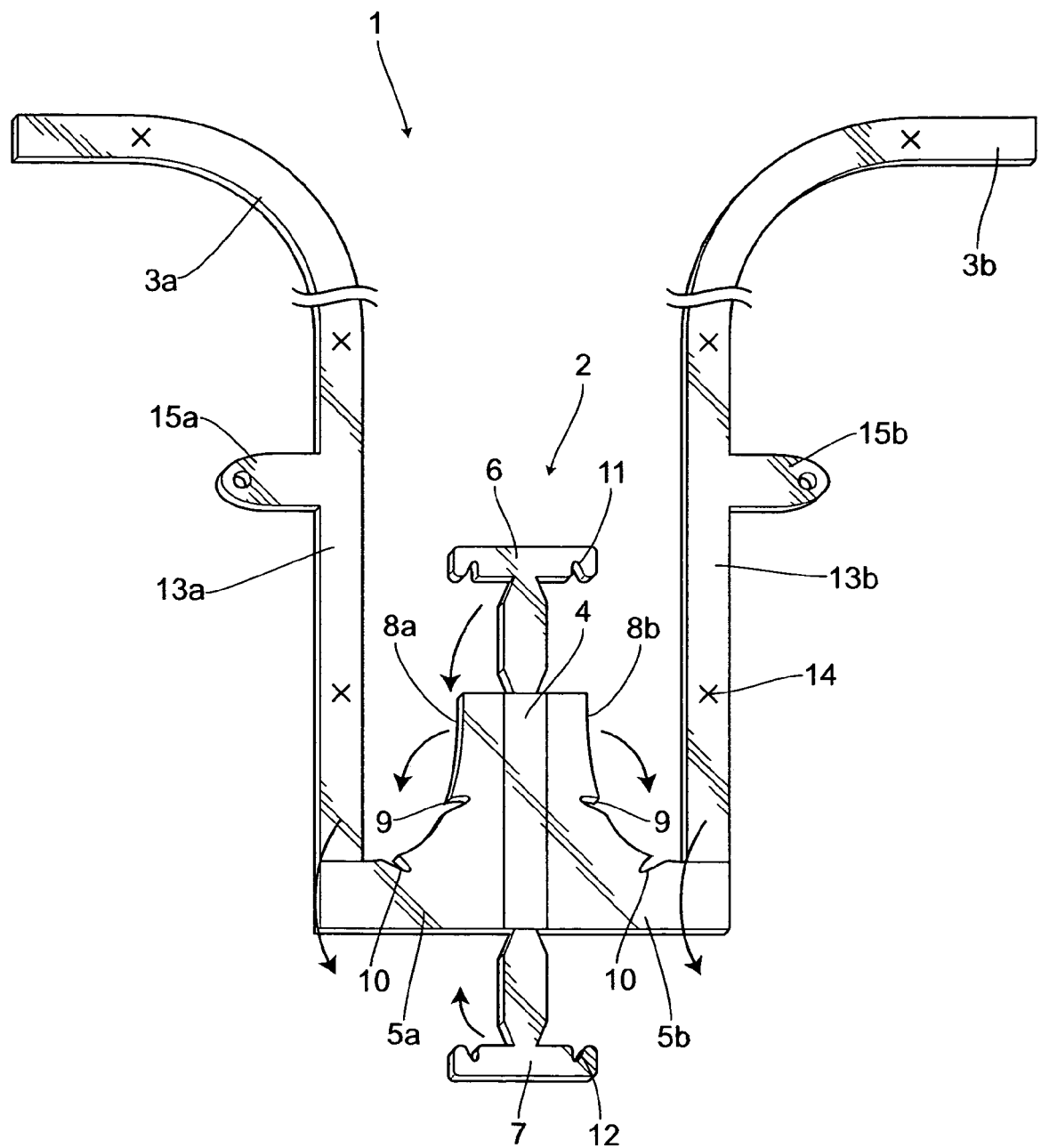
FIG. 2 is a development view illustrating the general structure of the positioning jig according to the first embodiment.

FIGS. 1 and 2 illustrate a positioning jig 1 for a vehicular-part mounting hole entirely which is used when vehicular-part mounting holes for mounting a rear under spoiler (not illustrated) are to be formed in the rear bumper (to be discussed later) of a vehicle. The positioning jig 1 is of a fold type, and is entirely made of a thick and hard paper material. As illustrated in FIG. 1, the positioning jig 1 comprises a jig main body 2 laid out at the approximate center, and band-like extending sections 3a, 3b extending from the jig main body 2 along the Y direction orthogonal to the X and Z directions.

When a paper material as a tabular member as illustrated in FIG. 2 is folded several times, the jig main body 2 is formed in an approximately box-like shape so as to be light and have a certain strength.

In practice, the jig main body 2 comprises an approximately rectangular central face section 4, side face sections 5a, 5b contiguous to the central face section 4, and folded inwardly at approximately right angles to face each other, a first clearance holding section 6 contiguous to one end of the central face section 4, and folded inwardly to be located between the side face sections 5a, 5b, and a second clearance holding section 7 contiguous to the other end of the central face section 4, and folded inwardly to be located between the side face sections 5a, 5b.

The side face sections 5a, 5b have engagement sections 8a, 8b which are formed in approximately L shapes and in the same shape with the central face section 4 in between, and are each formed in a curved shape concaved from one end to the other end along the contours of the back and bottom faces of the rear bumper of the vehicle.

Slits 9 having predetermined lengths are formed in the engagement sections 8a, 8b on that side of the first clearance holding section 6 in the same direction. Likewise, slits 10 having predetermined lengths are formed in the engagement sections 8a, 8b on that side of the second holding section 7 in the same direction.

The first clearance holding section 6 is formed in a shape such that an engagement piece 11 provided at the leading end of the first clearance holding section 6 is fitted into the individual slits 9 of the opposing side face sections 5a, 5b when the first clearance holding section 6 is folded inwardly from the contiguous portion of the central face section 4. The second clearance holding section 7 is formed in a shape such that an engagement piece 12 provided on the leading end of the second clearance holding section 7 is fitted into the individual slits 10 of the opposing side face sections 5a, 5b when the second clearance holding section 7 is folded inwardly from the contiguous portion of the central face section 4.

Regarding the first and second clearance holding sections 6, 7, the width sizes of middle portions provided between the contiguous portions and the individual engagement pieces 11, 12 are slightly narrower than those of the central face sections 4 in the lateral direction. Accordingly, when the middle portions are disposed between the side face sections 5a, 5b, and the side face sections 5a, 5b are folded at right angles or smaller angles with respect to the central face section 4, the side end parts of the middle portions can contact the side face sections 5a, 5b. Therefore, the first and second clearance holding sections 6, 7 can prevent the side face sections 5a, 5b from being folded at right angles or smaller angles with respect to the central face section 4.

Figure 3:
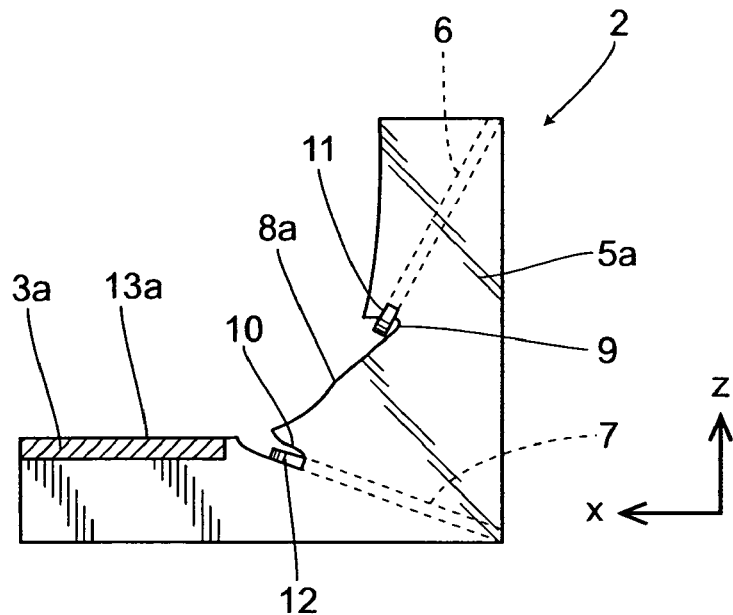
FIG. 3 is a side view illustrating how engagement pieces of first and second clearance-holding sections are put in slits.

In practice, as illustrated in FIG. 3, with the engagement pieces 11, 12 fitted in the slits 9, 10, respectively, the first and second clearance holding sections 6, 7 can prevent the side face sections 5a, 5b from being unfolded at right angles or greater angles with respect to the central face section 4. At this time, the first and second clearance holding sections 6, 7 are disposed between the side face sections 5a, 5b, thereby preventing the side face sections 5a, 5b from being folded at right angles or smaller angles with respect to the central face section 4. This makes it possible to hold the side face sections 5a, 5b in parallel with each other at a constant clearance.

In this embodiment, as the first clearance holding section 6 is provided on one end side of the central face section 4, and the second clearance holding section 7 is provided on the other end side of the central face section 4, the first and second clearance holding sections 6, 7 can be disposed between the side face sections 5a, 5b with the central face section 4 in between at a clearance defined therebetween. This ensures the constant clearance between the side face sections 5a, 5b, entirely even if an external force is applied inwardly from arbitrary portions of the side face sections 5a, 5b.

The extending sections 3a, 3b are light, have certain strengths, are formed in the approximately same shape as the bottom face of the rear bumper where a vehicular part is to be mounted, and are formed in an approximately L shape as a whole along the bottom face of the rear bumper.

One ends of the extending sections 3a, 3b are integrally formed with the side face sections 5a, 5b of the jig main body 2. The extending sections 3a, 3b are structured in such a way that flat portions 13a, 13b are approximately horizontally extended in the Y direction and the leading ends of those portions are extended in the X direction by folding the extending sections 3a, 3b from their contiguous portions.

In addition to this structure, the extending sections 3a, 3b are provided with a plurality of scribed marks 14 for drilling (in this case, for example, crosses) on both flat portions 13a, 13b beforehand, in association with the positions of the mounting holes of the rear under spoiler as the vehicular part. Those scribed marks 14 are measures of forming a scribing tool like a pushpin.

Further, in addition to those structures, the extending sections 3a, 3b are provided with positioning sections 15a, 15b which become measures when the forming marks 14 are positioned at predetermined positions in the bottom face of the rear bumper.

In practice, the positioning sections 15a, 15b have approximately the same shapes as those of the mounting sections provided on the rear bumper, and are protrudingly formed on portions away from each other at a predetermined distance which is the same as the distance between the mounting sections of the rear bumper, with the flat portions 13a, 13b being horizontally extended in the Y direction.

According to the above-described structures, the positioning jig 1 for the vehicular-part mounting hole as illustrated in FIG. 1 is formed from a piece of paper pattern as illustrated in FIG. 2 by the following steps.

First, with two parallel virtual fold lines respectively provided on the contiguous portions between the central face section 4 and the side face section 5a, or 5b being as ridge lines, both side face sections 5a, 5b are folded in the same direction at approximately right angles to face the side face sections 5a, 5b with each other.

Next, as this condition is held, with a parallel virtual fold line provided on the contiguous portion between the central face section 4 and the first clearance holding section 6 being as a ridge line, the first clearance holding section 6 is folded inwardly, and the engagement piece 11 is put in the slits 9 of the side face sections 5a, 5b. With a parallel virtual fold line provided on the contiguous portion between the central face section 4 and the second clearance holding section 7 being as a ridge line, the second clearance holding section 7 is folded inwardly, and the engagement piece 12 is put in the slits 10 of the side face sections 5a, 5b. Accordingly, the side face sections 5a, 5b can be stably supported in parallel with each other by the first and second clearance holding sections 6, 7, thereby ensuring the formation of the jig main body 2 with the certain strength. In this condition, the extending sections 3a, 3b are disposed in such a manner as to extend in the Z direction which is the longitudinal direction of the central face section 4.

Subsequently, with parallel virtual fold lines provided on the contiguous portions between the side face sections 5a, 5b and the extending sections 3a, 3b being as ridge lines, both extending sections 3a, 3b extending in the Z direction are folded outwardly at approximately right angles, so that the individual extending sections 3a, 3b are disposed as to extend in the direction as same as the Y direction. The positioning jig 1 for the vehicular-part mounting hole as illustrated in FIG. 1 can be formed from the tabular paper pattern as illustrated in FIG. 2 in this manner.

As explained above, the positioning jig 1 can be formed by folding a piece of tabular paper pattern, and the storage space of that jig 1 can be reduced before the folding as the positioning jig 1 is in a flat shape. This facilitates transportation of the positioning jig 1 together with the rear under spoiler.

Next, an explanation will be given of a case where the vehicular-part mounting holes are formed in the rear bumper by using the positioning jig 1 formed as explained above.

Figure 4:
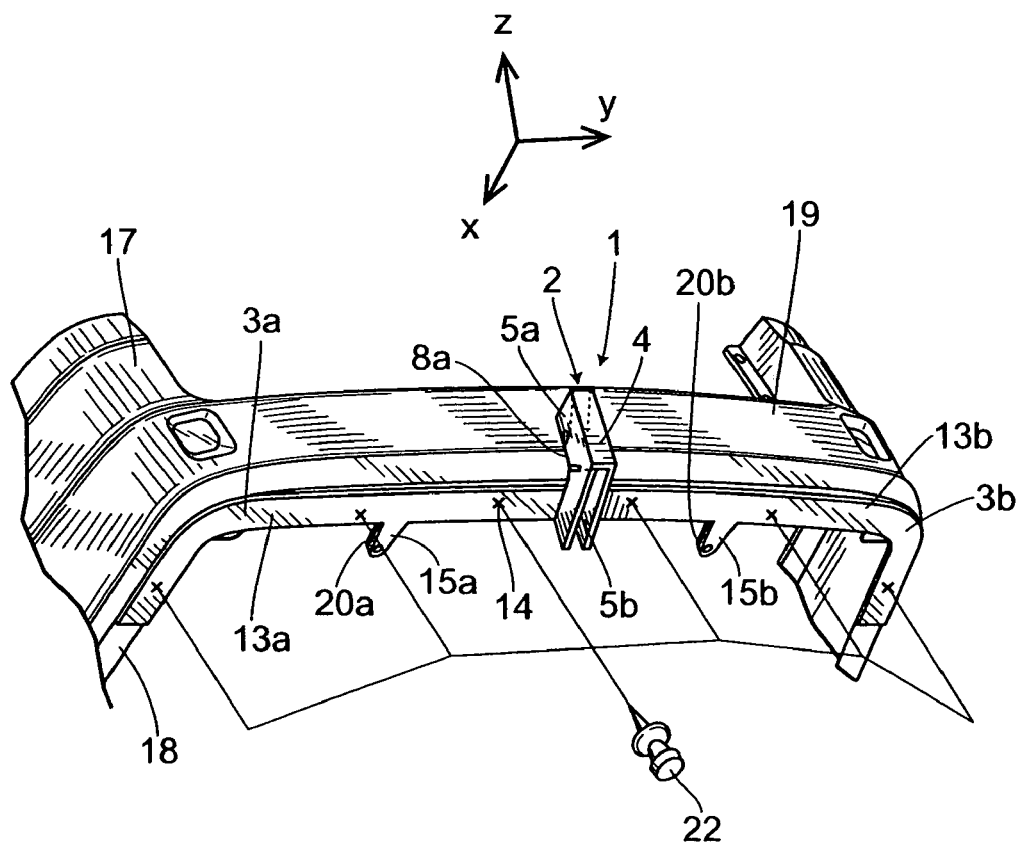
FIG. 4 is a perspective view illustrating how the positioning jig is positioned to a rear bumper.

As illustrated in FIG. 4, as a worker contacts the engagement sections 8a, 8b of the positioning jig 1 to the bottom face 18 and rear face 19 of the rear bumper 17 simultaneously, it is possible to regulate the movement of the jig main body 2 in the X direction as the traveling direction of the vehicle, and in the Z direction as the height direction of the vehicle orthogonal to the traveling direction. Consequently, the extending sections 3a, 3b can be positioned to the bottom face 18 of the rear bumper 17.

Figure 5:
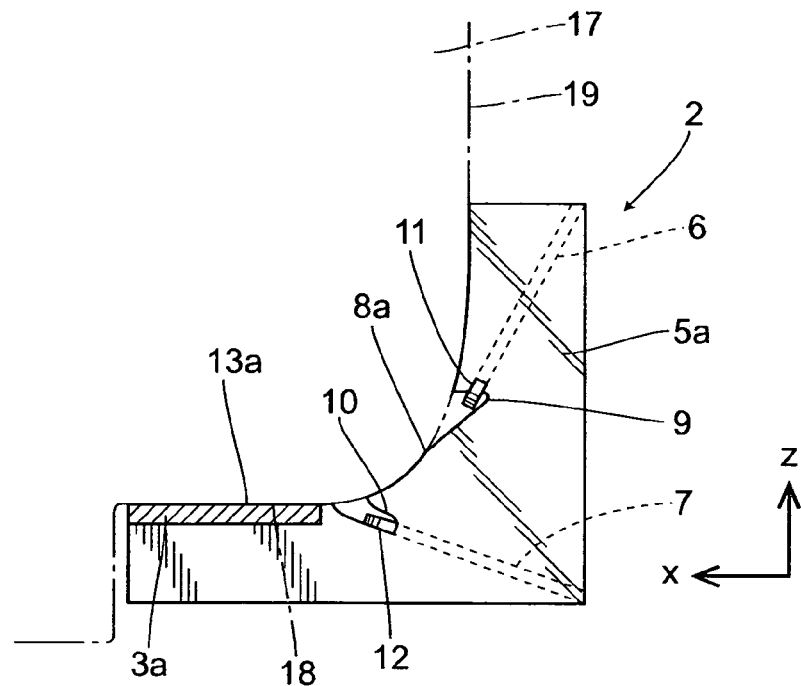
FIG. 5 is a side view illustrating how an extending section is positioned to the rear bumper by an engagement section.

In this embodiment, as illustrated in FIG. 5, because the engagement sections 8a, 8b are formed in curved shapes extending in the X and Z directions in accordance with the shape of the rear bumper 17, the jig main body 2 can contact the rear bumper 17 closely and surely along the contours of the bottom face 18 and rear face 19 of the rear bumper 17. Consequently, the jig main body 2 can be stably and surely positioned to the rear bumper 17 in the X direction (traveling direction) and the Z direction (height direction).

At this time, because the flat portions 13a, 13b of the extending sections 3a, 3b horizontally extend from the engagement sections 8a, 8b in the Y direction as the width direction of the vehicle, the flat portions 13a, 13b of the extending sections 3a, 3b can contact the bottom face 18 of the rear bumper 17 closely and surely.

With this condition being held in the positioning jig 1, as the positioning sections 15a, 15b are respectively positioned to mount portions 20a, 20b provided on the bottom face 18 of the rear bumper 17, the extending sections 3a, 3b can be precisely positioned in accordance with the shape of the bottom face 18 of the rear bumper 17. This results in the precise positioning of the scribed marks 14 corresponding to the mounting holes of the rear under spoiler with respect to the predetermined positions in the bottom face 18 of the rear bumper 17.

In the embodiment, because the worker can hold the three-dimensionally formed jig main body 2 as holding means, the jig main body 2 can easily move in the Y direction or the like while holding the extending sections 3a, 3b in horizontal postures. This facilitates positioning of the extending sections 3a, 3b to the bottom face 18 of the rear bumper 17.

As explained above, in the positioning jig 1, as the extending sections 3a, 3b can be positioned in the Y direction with reference to the mount portions 20a, 20b provided on the rear bumper 17 beforehand, the scribed marks 14 corresponding to the mounting holes of the rear under spoiler can be precisely positioned to the predetermined positions in the bottom face 18 of the rear bumper 17.

Figure 6:
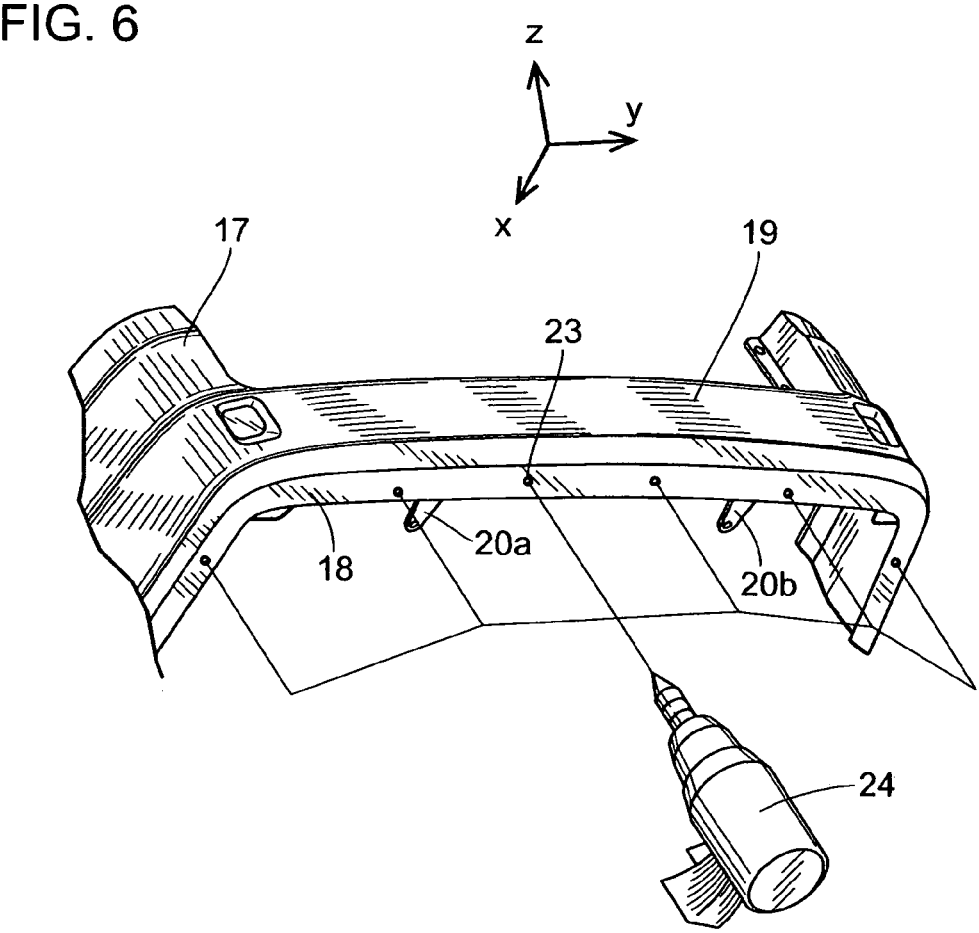
FIG. 6 is a perspective view illustrating how holes are made in the bottom face of the rear bumper.

Accordingly, in this condition, the worker pierces the scribed marks 14 of the extending sections 3a, 3b with a pushpin 22 and forms tiny holes at the positions of the scribed marks 14 from the front side of the bottom face 18 of the rear bumper 17, and as illustrated in FIG. 6, the worker forms holes 23 in the positions corresponding the scribed marks 14 in the rear bumper 17.

Afterward, when finishing forming the holes 23 by forming the scribed marks 14 on the rear bumper 17 with the pushpin 22, the worker removes the positioning jig 1 from the rear bumper 17.

Subsequently, the worker can form the vehicular-part mounting holes in the rear bumper 17 by a drill 24 based on the holes 23. In this manner, according to the positioning jig 1, with the rear bumper 17 being attached to the vehicle, the vehicular-part mounting holes corresponding to the mounting holes of the rear under spoiler can be precisely formed in the rear bumper 17.

Bolts are inserted into the vehicular-part mounting holes formed in the rear bumper 17 and the mounting holes of the rear under spoiler through like clip nuts, and the leading ends of the bolts are tightened with screw nuts, thereby mounting the vehicular exterior part (rear under spoiler) on the bottom face 18 of the rear bumper 17 as the predetermined position where the vehicular exterior part is to be mounted on.

According to the positioning jig 1, because the extending sections 3a, 3b are formed in shapes that extend only along the predetermined position where the rear under spoiler is to be mounted, the total region of the extending sections 3a, 3b can be reduced as much as possible, and the worker can easily handle the positioning jig 1.

Further, according to the positioning jig 1, as the extending sections 3a, 3b are folded outwardly from the Z direction toward the direction parallel to the Y direction in the fabrication process, the extending sections 3a, 3b can be positioned in closer contact with the bottom face 18 of the rear bumper 17 by adjusting the folding angles of those members.

According to the above-described structure, the scribed marks 14 are provided on the extending sections 3a, 3b based on the positions of the mounting holes of the rear under spoiler and the shape of the bottom face 18 of the rear bumper 17 to which that spoiler is to be mounted, the engagement sections 8a, 8b position the extending sections 3a, 3b in the X direction as the traveling direction of the vehicle and the direction Z as the height direction, and the positioning sections 15a, 15b make in use of the mount portions 20a, 20b provided on the rear bumper 17 to position the extending sections 3a, 3b in the Y direction as the width direction of the vehicle. Accordingly, once the positioning jig 1 is positioned to the rear bumper 17 with the engagement sections 8a, 8b and the positioning sections 15a, 15b, the forming positions of the vehicular-part mounting holes necessary in mounting the rear under spoiler can be precisely indicated on the rear bumper 17 based on the scribed marks 14. Therefore, a worker can pierce the vehicular-part mounting holes in appropriate positions by just forming holes in the positions of the scribed marks 14 without requiring a work of removing the rear bumper. This results in dramatical reduction in a work burden when a vehicular part is mounted, and considerable reduction in the operating time of the mounting work.

As the positioning jig 1 can be in a flat and tabular shape when not in use, the storage space for that jig 1 can be reduced. This facilitates packaging of the positioning jig 1 together with the rear under spoiler, thereby permitting that jig to be transported with the rear under spoiler.

Second Embodiment

Figure 7:
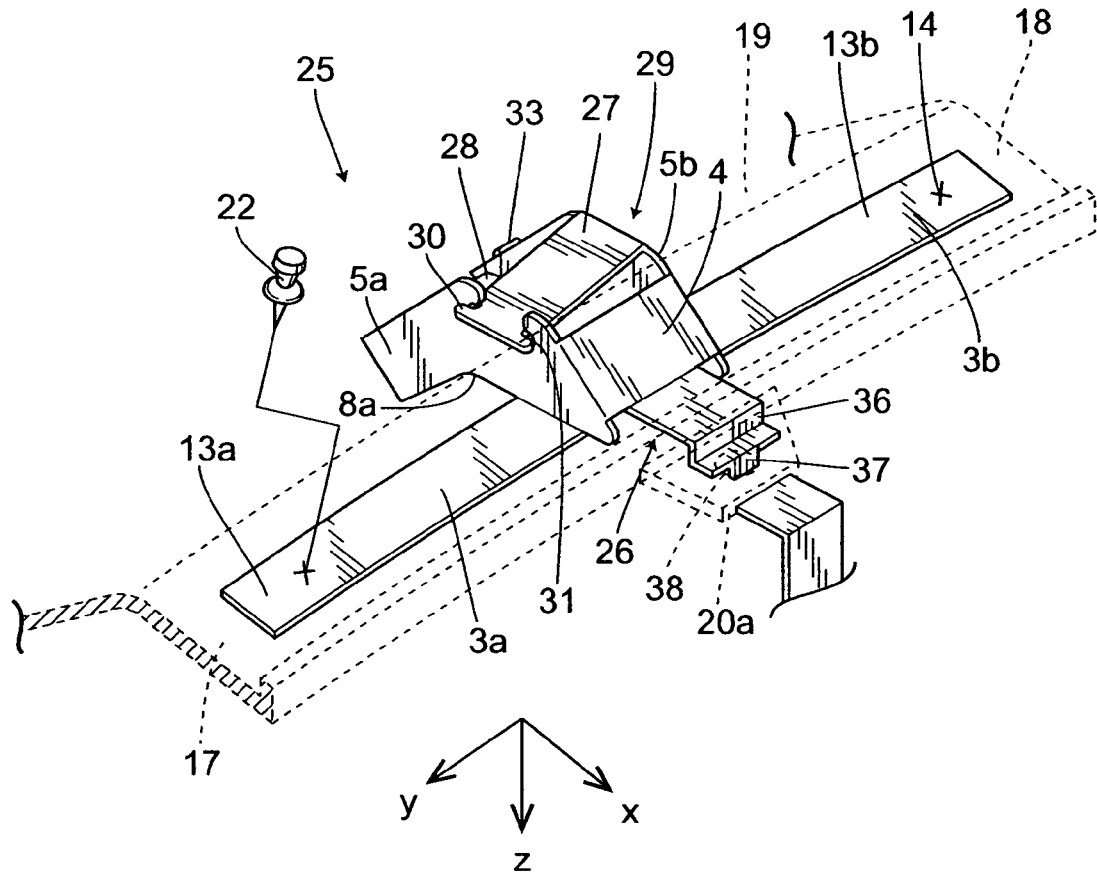
FIG. 7 is a perspective view illustrating the general structure of a positioning jig for a vehicular-part mounting hole according to a second embodiment.
Figure 8:
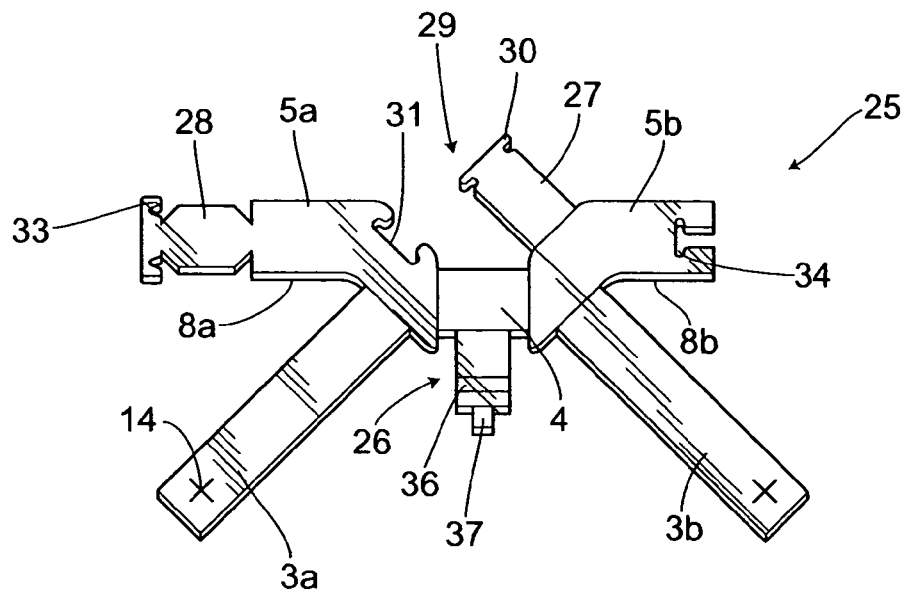
FIG. 8 is a development view illustrating the general structure of the positioning jig according to the second embodiment.

FIGS. 7 and 8 illustrate a positioning jig 25 for a vehicular-part mounting hole which is used when vehicular-part mounting holes for mounting a rear under spoiler are to be formed in the vehicular rear bumper 17. In FIGS. 7 and 8, the corresponding portions to those in FIGS. 1 and 2 will be denoted by the same reference numbers. In the positioning jig 25, the structure of the positioning section 26 and the positions of first and second clearance holding sections 27, 28 differ from those of the first embodiment. In this case, the overall view of the rear bumper 17 will be omitted, and an explanation will be given of only portions of the rear bumper 17 adjacent to the positioning jig 25.

The positioning jig 25 is of a fold type, and is entirely made of a thick and hard paper material. As illustrated in FIG. 7, the positioning jig 25 comprises a jig main body 29 laid out at the approximate center, and the band-like extending sections 3a, 3b extending from the jig main body 29 along the Y direction orthogonal to the X and Z directions.

When an integrally formed paper material as a tabular member as illustrated in FIG. 8 is folded several times, the jig main body 29 is formed in an approximately box-like shape so as to be light, and have a certain strength.

In practice, the jig main body 29 comprises the approximately rectangular central face section 4, the side face sections 5a, 5b contiguous to the central face section 4, and folded inwardly at approximately right angles to face each other, the first clearance holding section 27 contiguous to one side face section 5b, and folded inwardly to be located between the side face sections 5a, 5b, and the second clearance holding section 28 contiguous to the other side face section, and folded inwardly to be located between the side face sections 5a, 5b.

The first clearance holding section 27 is formed in a shape such that engagement pieces 30 provided at the leading end of the first clearance holding section 27 are fitted into individual slits 31 formed on the curved portion of the other side face section 5a, when the first clearance holding section 27 is folded inwardly from the contiguous portion of the side face section 5b. The second clearance holding section 28 is formed in a shape such that engagement pieces 33 provided on the leading end of the one side face section 5b are fitted into individual slits 34 formed on leading end of the one side face section 5b when the second clearance holding section 28 is folded inwardly from the contiguous portion of the side face section 5a.

Regarding the first and second clearance holding sections 27, 28, the width sizes of middle portions provided between the contiguous portions and the individual engagement pieces 30, 33 are slightly narrower than those of the central face sections 4 in the lateral direction. Accordingly, when the middle portions are disposed between the side face sections 5a, 5b, and the side face sections 5a, 5b are folded at less than or equal to right angels with respect to the central face section 4, the leading end parts of the middle portions can contact the side face sections 5a, 5b. Therefore, the first and second clearance holding sections 27, 28 can prevent the side face sections 5a, 5b from being folded at right angles or smaller angles with respect to the central face section 4.

Accordingly, with the engagement pieces 30, 33 fitted in the slits 31, 34, respectively, the first and second clearance holding sections 27, 28 can prevent the side face sections 5a, 5b from being unfolded at right angles or greater angles with respect to the central face section 4. At this time, the first and second clearance holding sections 27, 28 are disposed between the side face sections 5a, 5b, thereby preventing the side face sections 5a, 5b from being folded at right angles or smaller angles with respect to the central face section 4. This makes it possible to hold the side face sections 5a, 5b in parallel with each other at a constant clearance.

In this embodiment, as the first and second clearance holding sections 27, 28 are contiguous to different sides of the side face sections 5a, 5b with a clearance, the clearance between the side face sections 5a, 5b can be surely maintained even if an external force is applied inwardly from arbitrary portions of the side face sections 5a, 5b.

In addition to the above-described structure, the central face section 4 is provided with the convex positioning section 26 in a contiguous manner, and when the positioning section 26 are folded several times at right angles, a plurality of steps are structurally formed.

In practice, the positioning jig 25 comprises a band-like step adjustment piece 36, and a protrusion piece 37 which is provided on the leading end of the step adjustment piece 36, and is able to protrude in the Z direction with a smaller width than that of the step adjustment piece 36. The protrusion piece 37 is set to have a slightly smaller width than a diameter of a penetration 38 for inserting a bolt of the mount portion 20a for mounting the rear bumper 17 to a vehicle body.

One ends of the extending sections 3a, 3b are integrally formed with the side face sections 5a, 5b of the jig main body 29, and the extending sections 3a, 3b structurally extend in a direction parallel to the Y direction while holding the flat portions 13a, 13b in horizontal postures when folded from contiguous portions of the side face sections 5a, 5b. In this embodiment, the extending sections 3a, 3b are so formed as to extend only along a part of the bottom face 18 of the rear bumper 17 as the position on which the vehicular-part is to be mounted (in this case, an approximately straight part), and this makes it possible to further reduce the entire area of the extending sections 3a, 3b, and this facilitates a worker handling the positioning jig 25.

The extending sections 3a, 3b are respectively provided with the scribed marks 14 on the flat portions 13a, 13b beforehand corresponding to the positions of the mounting holes of the rear under spoiler.

According to the above-described structures, the positioning jig 25 for the vehicular-part mounting hole as illustrated in FIG. 7 is formed from a piece of paper pattern as illustrated in FIG. 8 by the following steps.

First, with parallel virtual fold lines respectively provided on the contiguous portions between the central face section 4 and the side face section 5a, or 5b being as ridge lines, both side face sections 5a, 5b are folded in the same direction at approximately right angles to face the side face sections 5a, 5b with each other.

Next, as this condition is held, with a parallel virtual fold line provided on the continuous portion between the central face section 4 and the first clearance holding section 27 being as a ridge line, the first clearance holding section 27 is folded inwardly, and the engagement piece 30 is put in the slit 31 of the side face sections 5a. With a parallel virtual fold line provided on the continuous portion between the central face section 4 and the second clearance holding section 28 being as a ridge line, the second clearance holding section 28 is folded inwardly, and the engagement piece 33 is put in the slit 34 of the side face sections 5b. Accordingly, the side face sections 5a, 5b can be stably supported in parallel with each other by the first and second clearance holding sections 27, 28, thereby ensuring formation of the jig main body 29 with a certain strength. In this condition, the extending sections 3a, 3b are disposed in such a manner as to extend in the Z direction which is the longitudinal direction of the central face section 4.

Subsequently, with parallel virtual fold lines provided on the contiguous portions between the side face sections 5a, or 5b and the extending sections 3a, or 3b being as ridge lines, both extending sections 3a, 3b extending in the Z direction are folded outwardly at approximately right angles, so that the individual extending sections 3a, 3b are disposed as to extend in the direction as same as the Y direction.

Further, with two parallel virtual fold lines provided on the positioning section 26 being as ridge lines, the positioning section 26 is folded at right angles to form the step adjustment piece 36 having two steps on two portions, an the protrusion piece 37 protruding in the Z direction.

The positioning jig 25 for the vehicular-part mounting hole as illustrated in FIG. 7 can be formed from the tabular paper pattern as illustrated in FIG. 8 in this manner.

Next, an explanation will be given of a case where the vehicular-part mounting holes are formed in the rear bumper 17 by using the positioning jig 25 formed as explained above.

As illustrated in FIG. 7, as a worker contacts the engagement sections 8a, 8b of the positioning jig 25 with the bottom and rear faces 18, 19 of the rear bumper 17 simultaneously, it is possible to regulate movement of the jig main body 29 in the X direction as the traveling direction of the vehicle, and in the Z direction as the height direction. Consequently, the extending sections 3a, 3b can be positioned to the bottom face 18 of the rear bumper 17.

In this embodiment, because the engagement sections 8a, 8b are formed in curved shapes extending in the X and Z directions in accordance with the shape of the rear bumper 17, the jig main body 29 can contact the rear bumper 17 closely and surely along the contours of the bottom and rear faces 18, 19 of the rear bumper 17. Consequently, the jig main body 29 can be stably and surely positioned to the rear bumper 17 in the X direction and the Z direction.

At this time, because the flat portions 13a, 13b of the extending sections 3a, 3b horizontally extend from the engagement sections 8a, 8b in the Y direction, the flat portions 13a, 13b of the extending sections 3a, 3b can surely contact the bottom face 18 of the rear bumper 17.

When the positioning work of the positioning jig 25 is carried out, a non-illustrated bolt is removed from the mount portion 20a beforehand.

As this condition is maintained, in the positioning jig 25, as the step adjustment piece 36 of the positioning section 26 contiguous to the central face section 4 is contacted to the mount portion 20a provided on the bottom face 18 of the rear bumper 17, and the protrusion piece 37 is inserted into the bolt-insertion penetration 38 of the mount portion 20a, the extending sections 3a, 3b can be precisely positioned in accordance with the shape of the bottom face 18 of the rear bumper 17 in the Y direction as the width direction of the vehicle. This results in the precise positioning of the scribed marks 14 corresponding to the mounting holes of the rear under spoiler with respect to the predetermined positions in the bottom face 18 of the rear bumper 17.

In the embodiment, because the worker can hold the three-dimensionally formed jig main body 29 as holding means, the jig main body 29 can be easily moved in the Y direction or the like while holding the extending sections 3a, 3b in horizontal postures. This facilitates positioning of the extending sections 3a, 3b to the bottom face 18 of the rear bumper 17.

As explained above, in the positioning jig 25, as the extending sections 3a, 3b can be positioned in the Y direction with reference to the penetration 38 provided on the rear bumper 17 beforehand, the scribed marks 14 corresponding to the mounting holes of the rear under spoiler can be precisely positioned to the predetermined positions in the bottom face 18 of the rear bumper 17.

Accordingly, in this condition, the worker pierces the scribed marks 14 of the extending sections 3a, 3b with the pushpin 22 and forms tiny holes in the positions of the scribed marks 14 from the front side of the rear bumper 17, and the worker forms holes in the positions in the rear bumper 17 corresponding the scribed marks 14.

After finishing forming the rear bumper 17 with the pushpin 22 at the scribed marks 14, the worker removes the positioning jig 25 from the rear bumper 17, and pierces the vehicular-part mounting holes in the rear bumper 17 by a drill based on the tiny holes. The positioning jig 25 herewith ensures precise forming of the vehicular-part mounting holes at positions in the rear bumper 17 corresponding to the mounting holes of the rear under spoiler with the rear bumper 17 being attached to the vehicle.

Bolts are inserted into the vehicular-part mounting holes formed in the rear bumper 17 and the mounting holes of the rear under spoiler through like clip nuts, and the leading ends of the bolts are tightened with screw nuts, thereby mounting the rear under spoiler as the vehicular exterior part on the bottom face 18 of the rear bumper 17 as the predetermined position where the vehicular exterior part is to be mounted on.

According to the above-described structure, the scribed marks 14 are provided on the extending sections 3a, 3b based on the positions of the mounting holes of the rear under spoiler and the shape of the bottom face 18 of the rear bumper 17 to which that spoiler is to be mounted, the engagement sections 8a, 8b position the extending sections 3a, 3b in the X direction as the traveling direction and the Z direction as the height direction, and the positioning section 26 makes in use of the penetration 38 provided on the rear bumper 17 to position the extending sections 3a, 3b in the Y direction as the width direction of the vehicle. Accordingly, once the positioning jig 25 is positioned to the rear bumper 17 with the engagement sections 8a, 8b and the positioning section 26, the forming positions of the vehicular-part mounting holes necessary in mounting the rear under spoiler can be precisely indicated with respect to the rear bumper 17 based on the scribed marks 14. Therefore, the worker can pierce the vehicular-part mounting holes in appropriate positions by just forming holes in the positions of the scribed marks 14 without requiring a work of removing the rear bumper. This results in dramatical reduction in a work burden when a vehicular part is mounted, and considerable reduction in the operating time of the mounting work.

Third Embodiment

Figure 9:
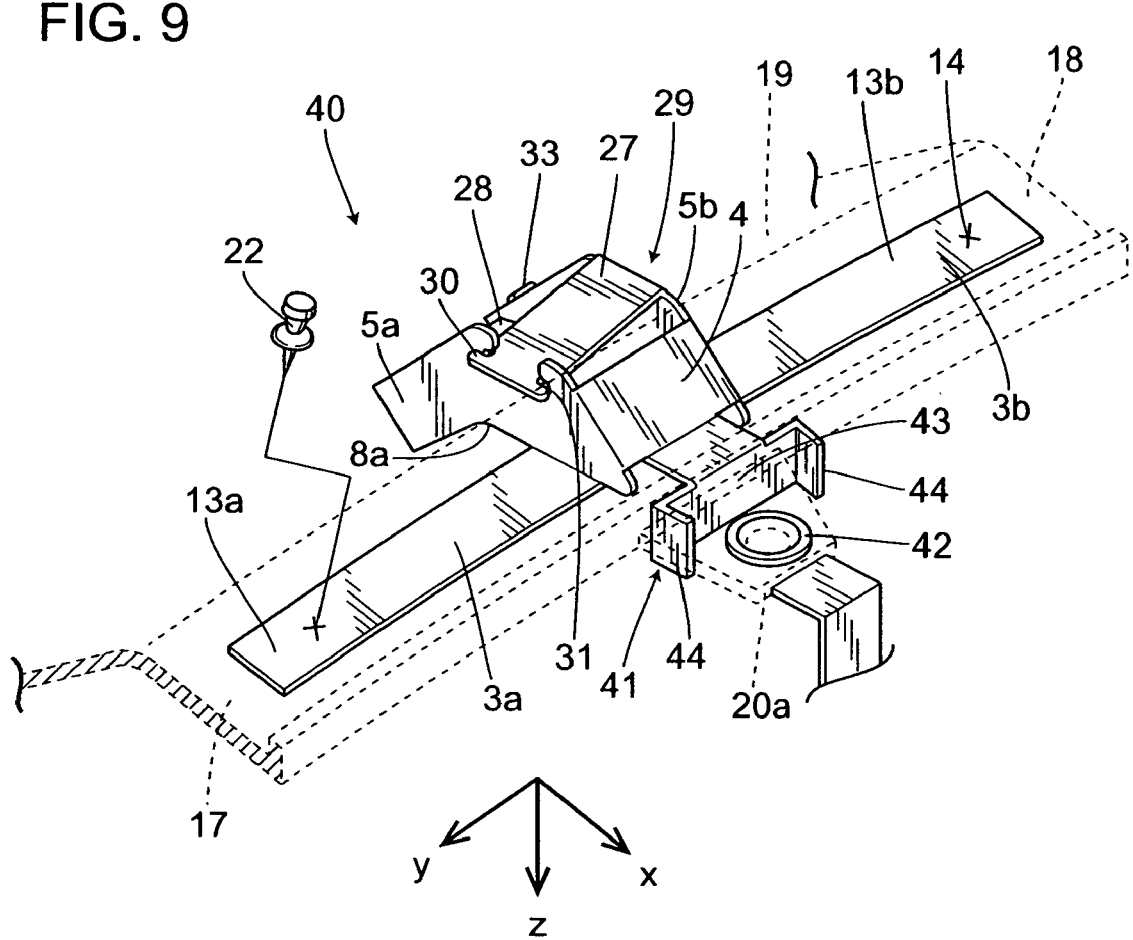
FIG. 9 is a perspective view illustrating the general structure of a positioning jig for a vehicular-part mounting hole according to a third embodiment.
Figure 10:
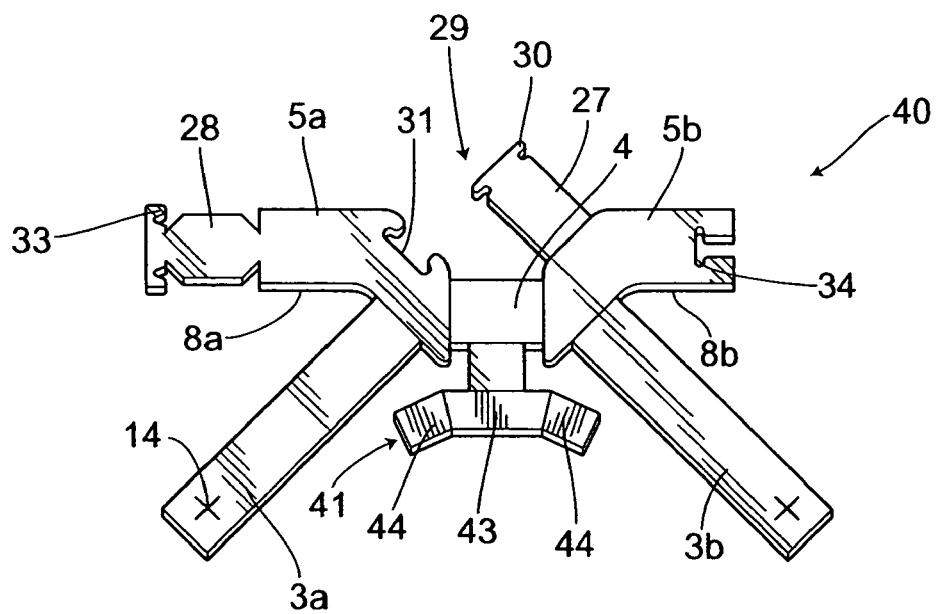
FIG. 10 is a development view illustrating the general structure of the positioning jig according to the third embodiment.

FIGS. 9 and 10 illustrate a positioning jig 40 for a vehicular-part mounting hole which is used when vehicular-part mounting holes for mounting a rear under spoiler are to be formed in the vehicular rear bumper 17. In FIGS. 9 and 10, the corresponding portions to those in FIGS. 7 and 8 will be denoted by the same reference numbers. In this case, explanations regarding the overall view and the duplicated portions of the rear bumper 17 will be omitted, and explanations will be given of portions of the rear bumper 17 adjacent to the positioning jig 40 and its structure different from that of the second embodiment.

For practical purpose, the positioning jig 40 is of a fold type, and the structure of the positioning section 41 differs from that of the second embodiment. The positioning jig 40 can be precisely positioned to a predetermined position without removing tightening means 42 like a pair of bolt and nut from the mount portion 20a of the rear bumper 17.

The central face section 4 is contiguous to one end of the positioning section 41, and when the positioning section 41 is folded several times at right angles, a plurality of steps are structurally formed.

For practical purpose, the positioning section 41 comprises an approximately T-shaped step adjustment piece 43 contiguous to one end of the central face section 4, and positioning pieces 44 which are contiguous to both ends of the step adjustment piece 43, and incline in the middle direction between the Y direction and the Z direction after fabrication. The positioning pieces 44 face each other when folded.

According to the above-described structure, first, the jig main body 29 and the extending sections 3a, 3b are formed from a piece of paper pattern in a similar fashion to the second embodiment.

In addition, in the positioning section 41, with a parallel virtual fold line provided on the positioning section 41 being as a ridge line, the step adjustment piece 43 is folded in the direction away from the jig main body 29 (Z direction) at the approximately right angle. While this condition is maintained, in the positioning section 41, the positioning pieces 44 contiguous to the step adjustment piece 43 are folded in the direction away from the jig main body 29 (X direction).

The positioning jig 40 for the vehicular-part mounting hole as illustrated in FIG. 9 can be formed from the tabular paper pattern as illustrated in FIG. 10 in this manner.

Next, an explanation will be given of a case where the vehicular-part mounting holes are formed in the rear bumper 17 by using the positioning jig 40 formed as explained above.

As illustrated in FIG. 9, as same as the above-described second embodiment, a worker contacts the engagement sections 8a, 8b of the positioning jig 40 with the bottom and rear faces 18, 19 of the rear bumper 17 simultaneously, and this makes it possible to regulate movement of the jig main body 29 in the X direction and in the Z direction. Consequently, the extending sections 3a, 3b can be positioned to the bottom face 18 of the rear bumper 17.

With this condition being maintained, in the positioning jig 40, the positioning pieces 44 are contacted to the contour of the mount portion 20a provided on the bottom face 18 of the rear bumper 17.

As explained above, in the positioning jig 40, as the extending sections 3a, 3b can be positioned in the Y direction with reference to the mount portion 20a even if the tightening means 42 is attached to the mount portion 20a. Consequently, the scribed marks 14 corresponding to the mounting holes of the rear under spoiler can be precisely positioned to the predetermined positions in the bottom face 18 of the rear bumper 17.

Accordingly, in this condition, the worker pierces the scribed marks 14 of the extending sections 3a, 3b with the pushpin 22 and forms tiny holes in the positions of the scribed marks 14 from the front side of the rear bumper 17, and the worker forms holes in the positions in the rear bumper 17 corresponding the scribed marks 14.

According to the above-described structure, the scribed marks 14 are provided on the extending sections 3a, 3b based on the positions of the mounting holes of the rear under spoiler and the shape of the bottom face 18 of the rear bumper 17 to which that spoiler is to be mounted, the engagement sections 8a, 8b position the extending sections 3a, 3b in the X direction as the traveling direction and the Z direction as the height direction, and the positioning section 41 makes in use of the contour of the mount portion 20a provided on the rear bumper 17 to position the extending sections 3a, 3b in the Y direction as the width direction of the vehicle. Accordingly, once the positioning jig 40 is positioned to the rear bumper 17 with the engagement sections 8a, 8b and the positioning section 41, the forming positions of the vehicular-part mounting holes necessary in mounting the rear under spoiler can be precisely indicated with respect to the rear bumper 17 based on the scribed marks 14. Therefore, the worker can pierce the vehicular-part mounting holes in appropriate positions by just forming holes in the positions of the scribed marks 14 without requiring a work of removing the rear bumper. This results in dramatical reduction in a work burden when a vehicular part is mounted, and considerable reduction in the operating time of the mounting work.

Fourth Embodiment

Figure 11:
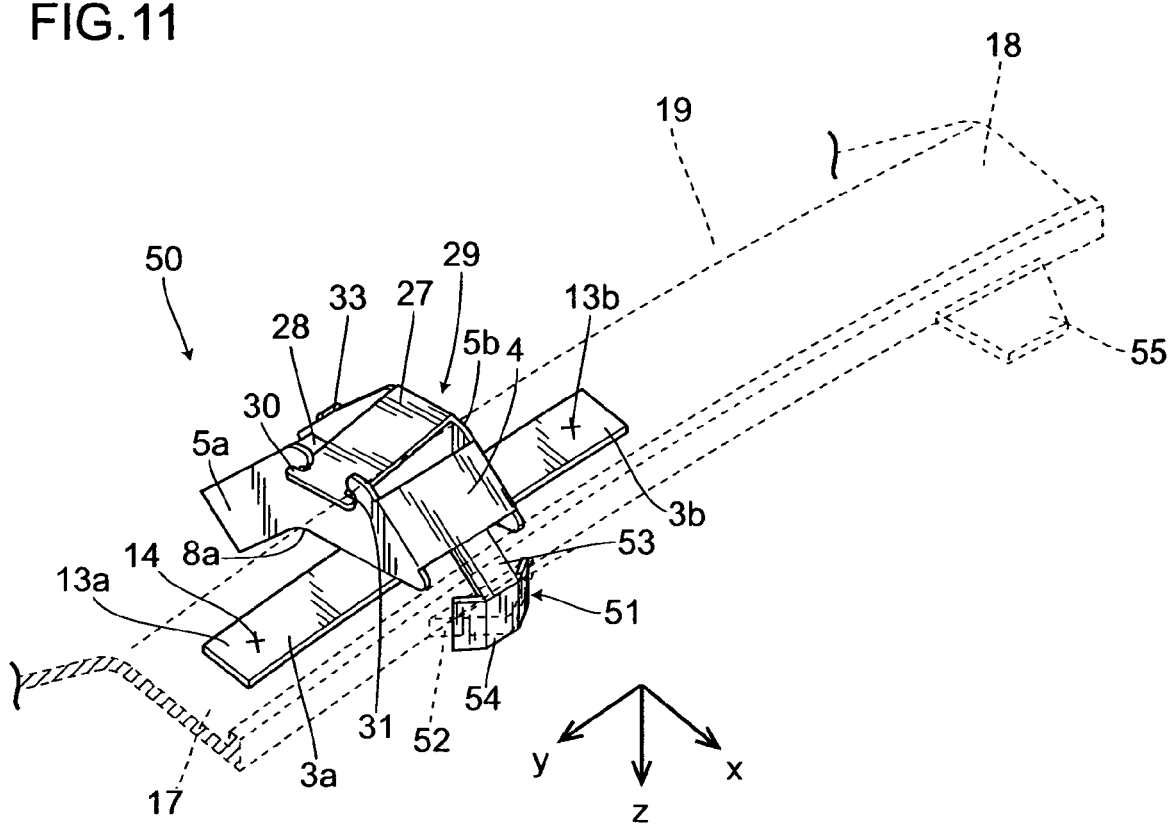
FIG. 11 is a perspective view illustrating the general structure of a positioning jig for a vehicular-part mounting hole according to a fourth embodiment.

FIG. 11 illustrates a positioning jig 50 for a vehicular-part mounting hole which is used when vehicular-part mounting holes for mounting a rear under spoiler are to be formed in the vehicular rear bumper 17. In FIG. 11, the corresponding portions to those in FIG. 7 will be denoted by the same reference numbers. In this case, explanations regarding the overall view and the duplicated portions of the rear bumper 17 will be omitted, and explanations will be given of portions of the rear bumper 17 adjacent to the positioning jig 50 and its structure different from that of the second embodiment.

For practical purpose, the positioning jig 50 is of a fold type, and the structure of the positioning section 51 differs from that of the second embodiment. The positioning jig 50 can be precisely positioned to a predetermined position by using a painting rib 52 provided on the rear bumper 17.

The central face section 4 is contiguous to an approximately T-shaped positioning section 51, and folding the positioning section 51 several times at predetermined angles, a plurality of steps are structurally formed.

For practical purpose, the positioning section 51 comprises a band-like step adjustment piece 53 whose one end is contiguous to the central face section 4, and a band-like positioning piece 54 contiguous to the leading end of the step adjustment piece 53. Adjusting the angle of the positioning piece 54, the positioning piece 54 can contact the contour of the painting rib 52 of the rear bumper 17.

According to the above-described structure, first, the jig main body 29 and the extending sections 3a, 3b are formed from a piece of paper pattern as same as the second embodiment.

In addition, in the positioning section 51, with a parallel virtual fold line provided on the positioning section 51 being as a ridge line, the step adjustment piece 53 is folded at a predetermined angle to incline, and both ends of the positioning piece 54 contiguous to the step adjustment piece 53 are folded in a direction close to the jig main body 29 at predetermined angles.

The positioning jig 50 for the vehicular-part mounting hole as illustrated in FIG. 11 can be formed from the tabular paper pattern in this manner.

Next, an explanation will be given of a case where the vehicular-part mounting holes are formed in the rear bumper 17 by using the positioning jig 50 formed as explained above.

As illustrated in FIG. 11, as same as the above-described second embodiment, a worker contacts the engagement sections 8a, 8b of the positioning jig 50 with the bottom and rear faces 18, 19 of the rear bumper 17, the extending sections 3a, 3b can be positioned to the rear bumper 17.

With this condition being maintained, in the positioning jig 50, the positioning piece 54 of the positioning section 51 are contacted to the contour of the painting rib 52 provided on the bottom face 18 of the rear bumper 17.

As explained above, in the positioning jig 50, as the extending sections 3a, 3b can be precisely positioned in the Y direction with reference to the painting rib 52, and this results in precise positioning of the scribed marks 14 corresponding to the mounting holes of the rear under spoiler with respect to the predetermined position in the bottom face 18 of the rear bumper 17.

In this embodiment, because the folding angle of the positioning piece 54 can be freely adjustable, the positioning piece 54 can contact a trapezoidal painting rib 55 different from the triangular painting rib 52 as illustrated in FIG. 11. Accordingly, once the contact portions of the positioning piece 54 to the painting ribs 52, 55 are determined beforehand, the extending sections 3a, 3b can be positioned with reference to painting ribs of various shapes.

Accordingly, in this condition, the worker pierces the scribed marks 14 of the extending sections 3a, 3b with a pushpin and forms tiny holes in the positions of the scribed marks 14 from the front side of the rear bumper 17, and the worker forms holes in the positions in the rear bumper 17 corresponding to the scribed marks 14. Therefore, based on those holes, the worker can pierce the vehicular-part mounting holes in the rear bumper 17 with a drill.

As explained above, according to the positioning jig 50, the vehicular-part mounting holes can be precisely formed in the positions in the rear bumper 17 corresponding to the mounting holes of the rear under spoiler with the rear bumper 17 being attached to the vehicle.

According to the above-described structure, the scribed marks 14 are provided on the extending sections 3a, 3b based on the positions of the mounting holes of the rear under spoiler and the shape of the bottom face 18 of the rear bumper 17 to which that spoiler is to be mounted, the engagement sections 8a, 8b position the extending sections 3a, 3b in the X direction as the traveling direction and the Z direction as the height direction, and the positioning section 51 makes in use of the contours of the painting ribs 52, 55 provided on the rear bumper 17 to position the extending sections 3a, 3b in the Y direction as the width direction of the vehicle. Accordingly, once the positioning jig 50 is positioned to the rear bumper 17 with the engagement sections 8a, 8b and the positioning section 51, the forming positions of the vehicular-part mounting holes necessary in mounting the rear under spoiler can be precisely indicated with respect to the rear bumper 17 based on the scribed marks 14. Therefore, the worker can pierce the vehicular-part mounting holes in appropriate positions by just forming holes in the positions of the scribed marks 14 without requiring a work of removing the rear bumper. This results in dramatical reduction in a work burden when a vehicular part is mounted, and considerable reduction in the operating time of the mounting work.

Fifth Embodiment

Figure 12:
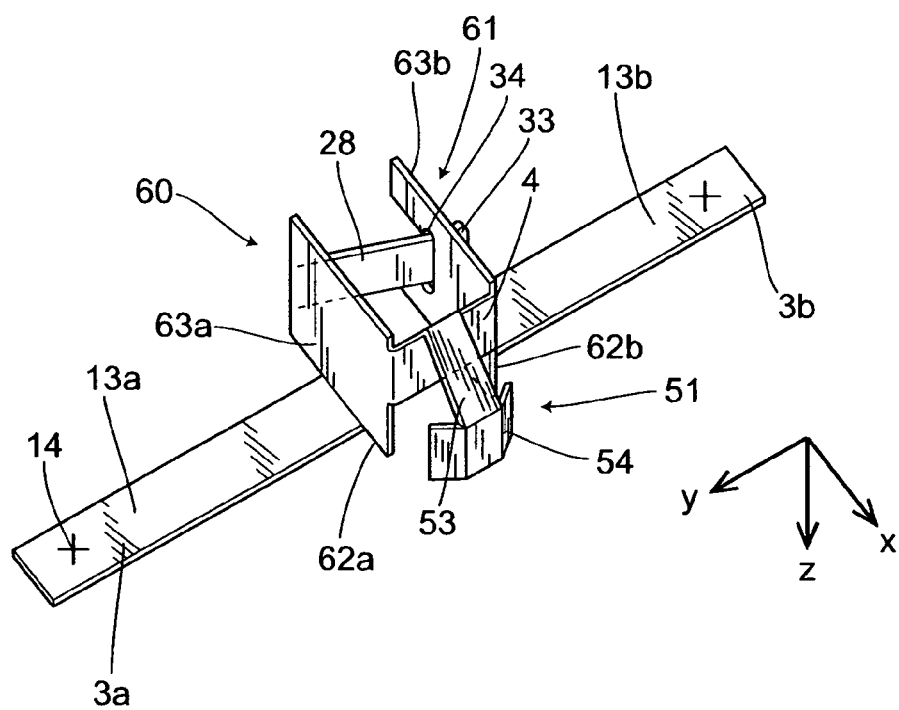
FIG. 12 is a perspective view illustrating the general structure of a positioning jig for a vehicular-part mounting hole according to a fifth embodiment.

FIG. 12 illustrates a positioning jig 60 for a vehicular-part mounting hole which is used when vehicular-part mounting holes for mounting a rear under spoiler are to be formed in the vehicular rear bumper 17. In FIG. 12, the corresponding portions to those in FIG. 7 will be denoted by the same reference numbers. In this case, explanations regarding the overall view and the duplicated portions of the rear bumper 17 will be omitted, and only the structure different from the fourth embodiment will be explained.

The positioning jig 60 is of a fold type, and is entirely made of a thick and hard paper material. The positioning jig 60 comprises a jig main body 61 laid out at the approximate center, and the band-like extending sections 3a, 3b extending from the jig main body 61 along the Y direction orthogonal to the X and Z directions. The structures of the jig main body 61 and engagement sections 62a, 62b differ from those of the fourth embodiment.

That is, the jig main body 61 comprises the approximate rectangular central face section 4, side face sections 63a, 63b contiguous to the central face section 4, and folded inwardly at right angles to face each other, and a second clearance holding section 28 whose one end is contiguous to one side face section 63a, and which is disposed between the side face sections 63a, 63b at a position opposite to the central face section 4.

With the engagement pieces 33 fitted in the slits 34, the second clearance holding section 28 can prevent the side face sections 63a, 63b from being unfolded at right angles or greater angles with respect to the central face section 4. At this time, the second clearance holding section 28 is disposed between the side face sections 63a, 63b, thereby preventing the side face sections 63a, 63b from being folded at right angles or smaller angles with respect to the central face section 4. This makes it possible to hold the side face sections 63a, 63b in parallel with each other at a constant clearance by the central face section 4 and only one second clearance holding section 28.

The side face sections 63a, 63b are formed in approximately rectangular shapes, and ones of their longitudinal sides are provided with the extending sections 3a, 3b.

In addition to the above-described structure, the approximately L-shaped engagement sections 62a, 62b along the contour of the bottom face of the rear bumper are formed on the side face sections 63a, 63b from their shorter sides contiguous to the central face section 4 to the longitudinal sides contiguous to the extending sections 3a, 3b via corners.

According to the above-described structures, the positioning jig 60 for the vehicular-part mounting hole as illustrated in FIG. 12 is formed from a piece of paper pattern by the following steps.

First, with two parallel virtual fold lines respectively provided on the contiguous portions between the central face section 4 and the side face section 63a, or 63b being as ridge lines, both side face sections 63a, 63b are folded in the same direction at approximately right angles so as to face each other.

Next, as this condition is maintained, with a parallel virtual fold line provided on the continuous portion between the side face section 63a and the second clearance holding section 28 being as a ridge line, the second clearance holding section 28 is folded inwardly, and the engagement pieces 33 are put in the slits 34 of the other side face section 63b. Accordingly, the side face sections 63a, 63b can be stably supported in parallel with each other by the second clearance holding section 28, thereby ensuring formation of the jig main body 61 with a certain strength. In this condition, the extending sections 3a, 3b are disposed in such a manner as to extend in the Z direction which is the longitudinal direction of the central face section 4.

Subsequently, with parallel virtual fold lines provided on the contiguous portions between the side face sections 5a, 5b and the extending sections 3a, 3b respectively being as ridge lines, both extending sections 3a, 3b extending in the Z direction are folded outwardly at approximately right angles, so that the individual extending sections 3a, 3b are disposed as to extend in the direction same as the Y direction. The positioning section 51 can be formed as same as the fourth embodiment.

Herewith, the positioning jig 60 for the vehicular-part mounting hole as illustrated in FIG. 12 can be formed from the piece of paper pattern.

Next, an explanation will be given of a case where the vehicular-part mounting holes are formed in the rear bumper by using the positioning jig 60 formed as explained above.

Figure 13A:
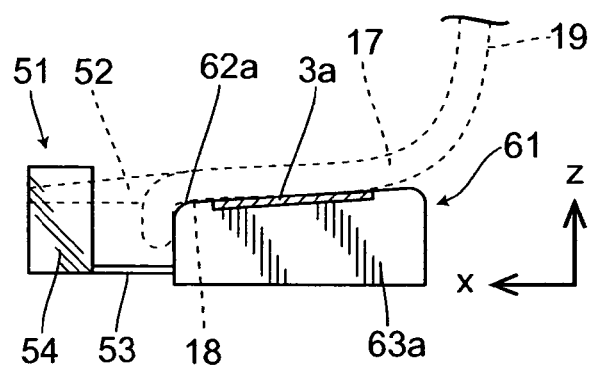
FIG. 13 is a side view devoting an explanation when an extending section is positioned to a rear bumper by a lathing section.

As illustrated in FIG. 13A, as a worker contacts the engagement sections 62a, 62b of the positioning jig 60 with a curved portion provided on the bottom face 18 of the rear bumper 17, it is possible to regulate movement of the jig main body 61 in the X direction as the traveling direction, and in the Z direction as the height direction. Consequently, the extending sections 3a, 3b can be positioned to the bottom face 18 of the rear bumper 17.

Figure 13B:
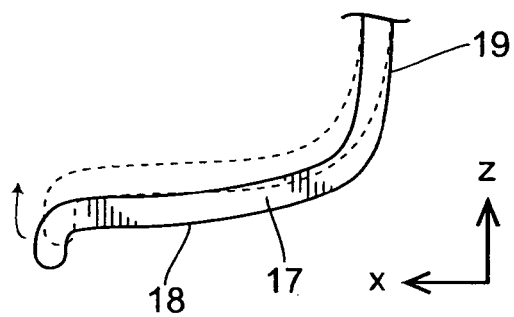

As the side face sections 63a, 63b contact the bottom face 18 of the rear bumper 17 only, the engagement sections 62a, 62b can surely contact the bottom face 18 of the rear bumper 17 as illustrated in FIG. 13A even if the bottom face 18 moves upward so that the angle between the bottom face 18 and the rear face 19 and the curved shape are changed as illustrated in FIG. 13B (represented by the dotted line). Consequently, the jig main body 61 can be stably and surely positioned in the X direction and the Z direction with respect to the rear bumper 17.

With this condition being maintained, in the positioning jig 60, the positioning piece 54 of the positioning section 51 are contacted to the contour of the painting rib 52 provided on the bottom face 18 of the rear bumper 17. Accordingly, the extending sections 3a, 3b can be precisely positioned with reference to the painting rib 52, and this results in precise positioning of the scribed marks 14 corresponding to the mounting holes of the rear under spoiler with respect to the predetermined positions in the bottom face 18 of the rear bumper 17.

Accordingly, in this condition, the worker pierces the scribed marks 14 of the extending sections 3a, 3b with a pushpin and forms tiny holes in the positions of the scribed marks 14 from the front side of the rear bumper 17, and the worker forms holes in the positions in the rear bumper 17 corresponding to the scribed marks 14. Therefore, based on those holes, the worker can pierce the vehicular-part mounting holes in the rear bumper 17 with a drill.

As explained above, according to the positioning jig 60, the vehicular-part mounting holes can be precisely formed in the positions in the rear bumper 17 corresponding to the mounting holes of the rear under spoiler with the rear bumper 17 being attached to the vehicle. Therefore, the same effectiveness as that of the fourth embodiment can be obtained.

Figure 14:
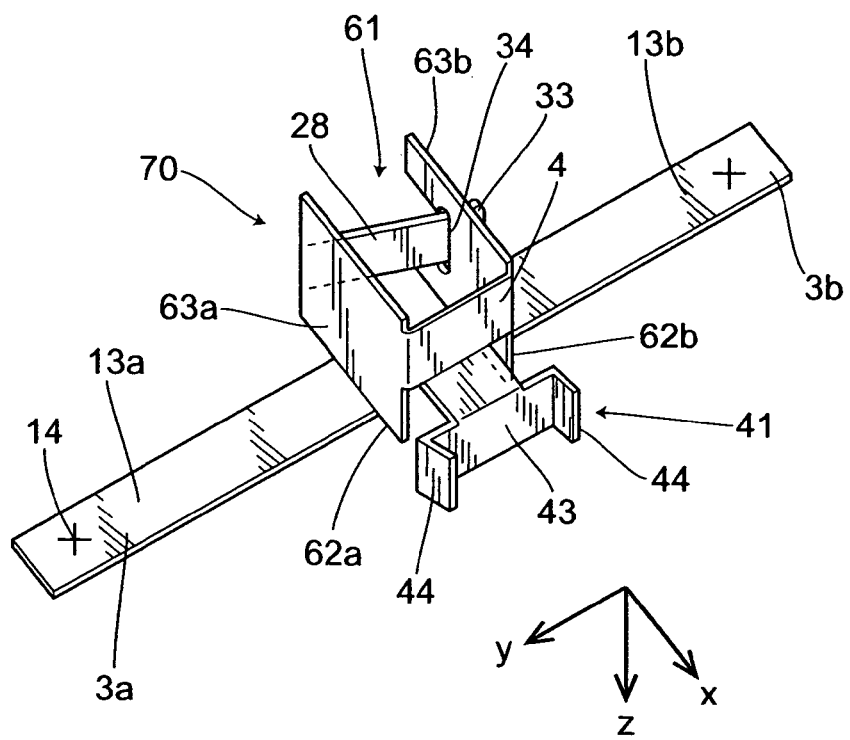
FIG. 14 is a perspective view illustrating the general structure of a positioning jig for a vehicular-part mounting hole according to another embodiment.

In this embodiment, whilst the explanation is given of a case where the positioning jig 60 for the vehicular-part mounting holes has the approximately T-shaped positioning section 51 of the fourth embodiment, the present invention is not limited to this case. For example, as illustrated in FIG. 14 where the corresponding portions to those of FIGS. 9 and 12 are denoted by the same reference numbers, a positioning jig 70 for the vehicular-part mounting holes may have the positioning section 41 formed in the same shape as that of the third embodiment.

Sixth Embodiment

Figure 15:
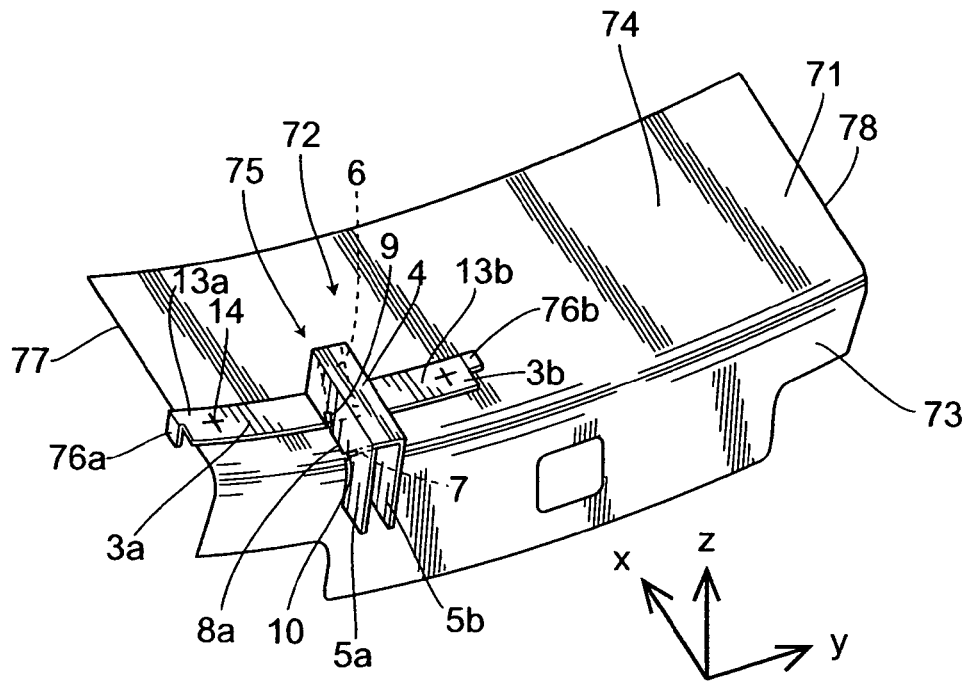
FIG. 15 is a perspective view illustrating the general structure of a positioning jig for a vehicular-part mounting hole according to a sixth embodiment.

FIG. 15 illustrates a positioning jig 72 for a vehicular-part mounting hole which is used when vehicular-part mounting holes for mounting a rear spoiler (not illustrated) as a vehicular part are to be formed in a trunk lid 71. In FIG. 15, the corresponding portions to those in FIG. 1 will be denoted by the same reference numbers. The positioning jig 72 is of a fold type, and is entirely made of a thick and hard paper material. The positioning jig 72 comprises a jig main body 75 laid out at the approximate center, and the band-like extending sections 3a, 3b extending from the jig main body 75 along the Y direction as the width direction of a vehicle orthogonal to the X direction as the traveling direction and the Z direction as the height direction. In this case, in the positioning jig 72, the jig main body 75 is structured in such a way that the engagement sections 8a, 8b can contact and are engaged with rear and top faces 73, 74 of the trunk lid 71, and the fabrication method from a tabular paper pattern is same as that of the first embodiment, and the detailed explanation of that method will be omitted.

That is, the jig main body 75 comprises the approximately rectangular central face section 4, side face sections 5a, 5b contiguous to the central face section 4, and folded inwardly at approximately right angles to face each other, the first clearance holding section 6 contiguous to one end of the central face section 4, and folded inwardly to be located between the side face sections 5a, 5b, and the second clearance holding section 7 contiguous to the other end of the central face section 4, and folded inwardly to be located between the side face sections 5a, 5b. The engagement sections 8a, 8b of the side face sections 5a, 5b are formed in approximately curved shapes so as to match with the shape of the trunk lid 71 from the rear face 73 of the trunk lid 71 to the top face 74 thereof.

The extending sections 3a, 3b are light, and have certain strengths, are formed in band-like shapes, and their respective bottoms are integrally formed with the side face sections 5a, 5b of the jig main body 75. The extending sections 3a, 3b can extend in the Y direction as the width direction orthogonal to the X direction as the traveling direction and the Z direction as the height direction while holding the flat portions 13a, 13b in horizontal postures when folded from the contiguous portions of the side face sections 5a, 5b. In addition to this structure, engagement pieces 76a, 76b as foldable positioning sections are respectively provided on the leading ends of the extending sections 3a, 3b.

In this embodiment, the linear dimensions in the longitudinal directions of the extending sections 3a, 3b which sandwiches the formed jig main body 75 and folded in the Y direction are individually set as to be shorter than approximately half of the width of the trunk lid 71 (size in the Y direction).

The extending sections 3a, 3b are provided with the scribed marks 14 beforehand for drilling both flat portions 13a, 13b, in association with the positions of the mounting holes of the rear spoiler. Those scribed marks 14 are to be measures of pounding a scribing tool like a pushpin.

An explanation will be given of a case where the vehicular-part mounting holes are formed in the trunk lid 71 by using the above-described structured positioning jig 72 formed from a piece of paper pattern in a similar fashion to the first embodiment.

As illustrated in FIG. 15, as a worker contacts the engagement sections 8a, 8b of the positioning jig 72 with the bottom and rear faces 73, 74 of the trunk lid 71, it is possible to regulate movement of the jig main body 75 in the X direction as the traveling direction of the vehicle, and in the Z direction as the height direction of the vehicle orthogonal to the traveling direction. Consequently, the extending sections 3a, 3b can be positioned to the top face 71 of the trunk lid 71.

In this embodiment, because the engagement sections 8a, 8b are formed in curved shapes extending in the X and Z directions in accordance with the shape of the trunk lid 71 from the rear face 73 to the top face 74, the entire jig main body 75 can contact the trunk lid 71 closely and surely along the rear and top faces 73, 74 of the trunk lid 71. Consequently, the jig main body 75 can be further stably and surely positioned to the trunk lid 71 in the X direction and the Z direction.

At this time, because the flat portions 13a, 13b of the extending sections 3a, 3b horizontally extend from the engagement sections 8a, 8b in the Y direction, the flat portions 13a, 13b of the extending sections 3a, 3b can contact top face 74 of the trunk lid 71 closely and surely.

Next, as the worker folds the engagement piece 76a on provided on the leading end of one extending section 3a, and engages the engagement piece 76a with one side-end portion 77 of the trunk lid 71, movements of the jig main body 75 and the extending sections 3a, 3b in the Y direction can be regulated. Accordingly, with reference to one side-end portion 77 of the trunk lid 71, the jig main body 75 can be positioned to the trunk lid 71.

As explained above, according to the positioning jig 72, the engagement sections 8a, 8b are latched together with the rear and top faces 73, 74 of the trunk lid 71, and the engagement piece 76a is lathed together with one side-end portion 77 of the trunk lid 71. Accordingly, incorrect positioning of the jig main body 75 in the X, Y, and Z directions (that is, the traveling, width, and height directions of the vehicle) can be surely prevented, and this results in precise and stable positioning of the scribed marks 14 corresponding to the mounting holes of the rear spoiler with respect to predetermined positions in the top face 74 of the trunk lid 71.

Because the worker can hold the three-dimensionally formed jig main body 75 as holding means, the jig main body 75 can be easily moved while contacting the jig main body 75 with the top face 74 of the trunk lid 71. This facilitates positioning of the engagement piece 76a of one extending sections 3a to one side-end portion 77 of the trunk lid 71.

Accordingly, in this condition, the worker pierces the scribed marks 14 of the extending sections 3a, 3b with a pushpin and forms tiny holes in the positions of the scribed marks 14 from the front side of the trunk lid 71, thereby forming holes corresponding to the positions of the scribed marks 14 with respect to the area of the one side of the trunk lid 71.

After finishing forming the area of the one side of the trunk lid 71, the worker moves the positioning jig 72 to the area of the other side of the trunk lid 71, folds the other engagement piece 76b, engages the other side-end portion 78 of the trunk lid 71 with the engagement piece 76b, thus positioning the positioning jig 72 to the other side of the trunk lid 71.

Accordingly, in this condition, the worker pierces the scribed marks 14 of the extending sections 3a, 3b with the pushpin and forms tiny holes in the positions of the scribed marks 14 from the front side of the trunk lid 71, thereby forming holes corresponding to the positions of the scribed marks 14 with respect to the area of the other side of the trunk lid 71.

As explained above, in the positioning jig 72, although the size of the extending sections 3a, 3b in the longitudinal directions are shorter than approximately half of the width of the trunk lid 71, it is possible to surely forming holes across the entire width direction of the trunk lid 71 (Y direction).

Consequently, the worker can piece the vehicular-part mounting holes in the trunk lid 71 by a drill based on those holes. The positioning jig 72 herewith can precisely pierce the vehicular-part mounting holes corresponding to the mounting holes of the rear spoiler in the trunk lid 71 without the work of the conventional techniques like temporally mounting the rear spoiler on the trunk lid 71.

Bolts are inserted into the vehicular-part mounting holes formed in the trunk lid 71 and the mounting holes of the rear spoiler through like clip nuts, and the leading ends of the bolts are tightened with screw nuts, thereby mounting the rear spoiler as the vehicular exterior part on the top face 74 of the trunk lid 71 as the predetermined position where the vehicular exterior part is to be mounted on.

According to the above-described structure, the scribed marks 14 are provided on the extending sections 3a, 3b based on the positions of the mounting holes of the rear spoiler and the shape of the top face 74 of the trunk lid 71 to which that spoiler is to be mounted, the engagement sections 8a, 8b position the extending sections 3a, 3b in the X direction as the traveling direction and the Z direction as the height direction, and the engagement pieces 76a, 76b make in use of the side-end portions of the trunk lid 71 to position the extending sections 3a, 3b in the Y direction as the width direction of the vehicle. Accordingly, once the positioning jig 72 is positioned to the trunk lid 71 with the engagement sections 8a, 8b and the engagement pieces 76a, 76b, the forming positions of the vehicular-part mounting holes necessary in mounting the rear spoiler can be precisely indicated with respect to the trunk lid 71 based on the scribed marks 14. Therefore, the worker can pierce the vehicular-part mounting holes in appropriate positions by just forming holes in the positions of the scribed marks 14 without requiring a work of removing the rear bumper. This results in dramatical reduction in a work burden when a vehicular part is mounted, and considerable reduction in the operating time of the mounting work.

As the positioning jig 72 can be in a flat and tabular shape when not in use, the storage space for that jig 72 can be reduced. This facilitates packaging of the positioning jig 72 together with the rear spoiler, thereby permitting that jig to be transported with the rear spoiler.

Seventh Embodiment

Figure 16:
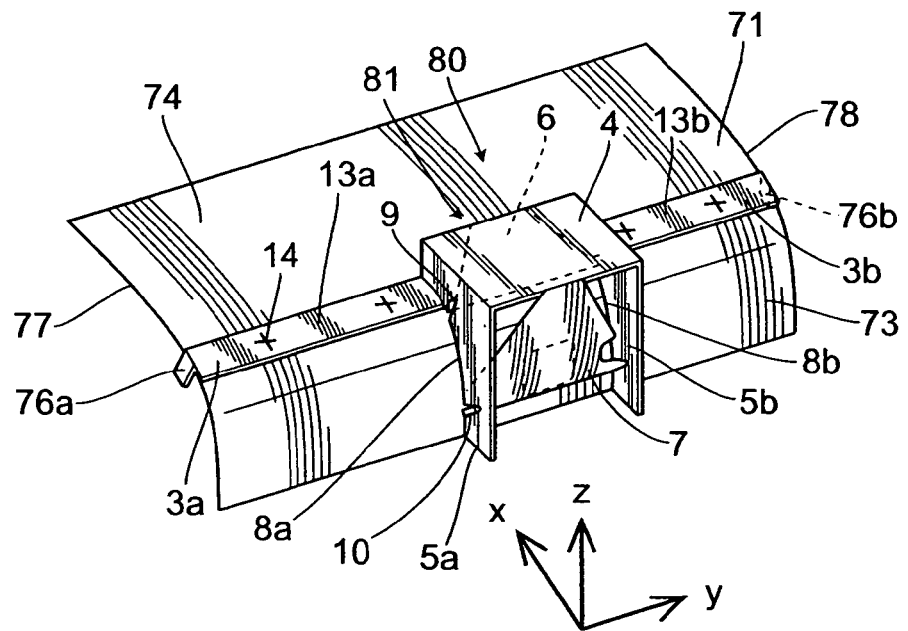
FIG. 16 is a perspective view illustrating the general structure of a positioning jig for a vehicular-part mounting hole according to a seventh embodiment.
Figure 17:
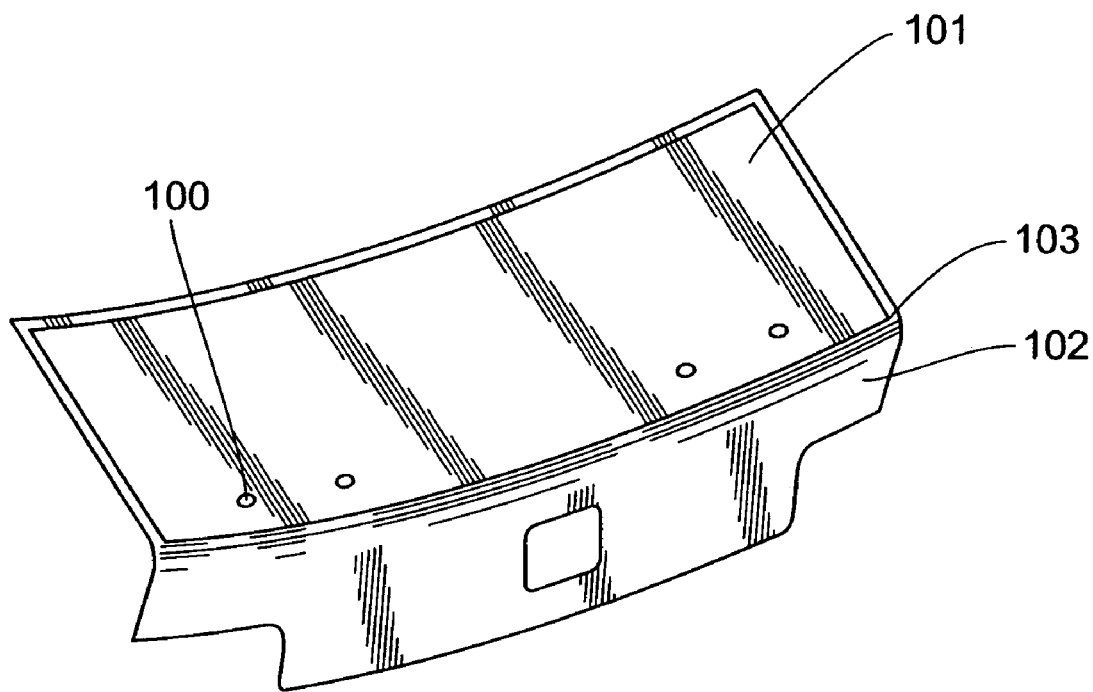
FIG. 17 is a perspective view illustrating how a conventional paper pattern is positioned to a trunk lid.

FIG. 16 illustrates a positioning jig 80 for a vehicular-part mounting hole which is used when vehicular-part mounting holes for mounting a rear spoiler are to be formed in the trunk lid 71. In FIG. 16, the corresponding portions to those in FIG. 15 will be denoted by the same reference numbers. In the positioning jig 80, the size of a jig main body 81 differs from that of the sixth embodiment, and the lengths in the longitudinal directions of the extending sections 3a, 3b also differ from those of the sixth embodiment. The positioning jig 80 is so structured as to position the extending sections 3a, 3b across the entire width direction of the trunk lid 71 (Y direction) by positioning the jig main body 81 to around the center of the trunk lid 71. The fabrication method of the positioning jig 80 and the structure of the jig main body 81 are the same as those of the first and sixth embodiments, thereby omitting their explanations.

That is, the positioning jig 80 is of a fold type, and is entirely made of a thick and hard paper material. The positioning jig 80 comprises the band-like extending sections 3a, 3b extending from the jig main body 81 along the Y direction orthogonal to the X direction and the Z direction.

The extending sections 3a, 3b are light, and have certain strengths, are formed in band-like shapes, and their respective bottoms are integrally formed with the side face sections 5a, 5b of the jig main body 81. The extending sections 3a, 3b can extend in the Y direction while holding the flat portions 13a, 13b in horizontal postures when folded from the contiguous portions of the side face sections 5a, 5b. In addition to this structure, the foldable engagement pieces 76a, 76b are respectively provided on the leading ends of the extending sections 3a, 3b.

In this embodiment, the linear dimensions in the longitudinal directions of the extending sections 3a, 3b which sandwiches the formed jig main body 81 and folded in the Y direction are individually set as to be the approximately same as the width of the trunk lid 71 (size in the Y direction).

The extending sections 3a, 3b are provided with the plurality of scribed marks 14 beforehand for drilling both flat portions 13a, in association with the positions of the mounting holes of the rear spoiler. Those scribed marks 14 are to be measures of pounding a scribing tool like a pushpin.

An explanation will be given of a case where the vehicular-part mounting holes are formed in the trunk lid 71 by using the above-described structured positioning jig 80 formed from a piece of paper pattern in a similar fashion to the first embodiment.

As illustrated in FIG. 16, as a worker contacts the engagement sections 8a, 8b of the positioning jig 80 with the bottom and rear faces 73, 74 of the trunk lid 71, it is possible to regulate movement of the jig main body 75 in the X direction as the traveling direction of the vehicle, and in the Z direction as the height direction of the vehicle orthogonal to the traveling direction. Consequently, the extending sections 3a, 3b can be positioned to the top face 71 of the trunk lid 71.

At this time, the worker can simultaneously engages the engagement pieces 76a, 76b respectively provided on the leading ends of the extending sections 3a, 3b, with both side-end portions 77, 78 of the trunk lid 71 by positioning the jig main body 81 to around the center of the trunk lid 71. Accordingly, movements of the jig main body 81 and the extending sections 3a, 3b in the Y direction can be regulated, and thus the extendingly provided sections 3a, 3b can be further surely and stably positioned to the trunk lid 71 with reference to both side-end portions 77, 78 of the trunk lid 71.

As explained above, according to the positioning jig 80, as the engagement sections 8a, 8b and the rear and top faces 73, 74 of the trunk lid 71 are latched together, and the engagement pieces 76a, 76b and both side-end sections 77, 78 of the trunk lid 71 are simultaneously latched together, incorrect positioning of the jig main body 81 in the X, Y, and Z directions (that is, the traveling, width, and height directions of the vehicle) can be further surely prevented, resulting in precise and stable positioning of the scribed marks 14 corresponding to the mounting holes of the rear spoiler with respect to the predetermined positions in the top face 74 of the trunk lid 71.

Accordingly, in this condition, the worker pierces the scribed marks 14 of the extending sections 3a, 3b with a pushpin and forms tiny holes in the positions of the scribed marks 14 from the front side of the trunk lid 71, thereby forming holes in positions corresponding to the positions of the scribed marks 14 with respect to the trunk lid 71.

Thus, the worker can form all holes in the trunk lid 71 at one time based on the scribed marks 14 without moving the positioning jig 80, thereby reducing the work burden in comparison with the six embodiment.

The worker can piece the vehicular-part mounting holes in the trunk lid 71 by a drill based on those holes. The positioning jig 80 herewith can precisely pierce the vehicular-part mounting holes corresponding to the mounting holes of the rear spoiler in the trunk lid 71 without the work of conventional techniques like temporally mounting the rear spoiler on the trunk lid 71. Therefore, the same effectiveness as that of the sixth embodiment can be achieved.

Other Embodiments

Regarding the first to seventh embodiments, although the explanations have been given of cases where the positioning jigs 1, 25, 40, 50, 60, 70, 72, and 80 are formed from tabular paper members, the present invention is not limited to those cases. The positioning jig may be formed from various members such as a tabular foldable plastic member and so on.

Regarding the first to fifth embodiments, although the explanations have been given of cases where the positioning jigs 1, 25, 40, 50, 60, and 70 are used when the rear under spoiler is attached to the rear bumper 17, the invention is not limited to those cases, and the positioning jigs 1, 25, 40, 50, 60, and 70 may be used when a front under spoiler is attached to a front bumper.

Regarding the first to seventh embodiments, the explanations have been given of cases where the extending sections that extend from the jig main body defined by the engagement section to the position on which the vehicular part is to be mounted, are the sections that closely contact the bottom face 18 of the rear bumper 17 and the top face 74 of the trunk lid 71 and run along the position on which the vehicular part is to be mounted. The invention, however, is not limited to those cases, in fact, the extending sections just have to extend from the engagement section defined by the engagement section to the position on which the vehicular part is to be mounted. The extending sections may be formed in various shape such that they have spaces from the bottom face 18 of the rear bumper 17 and the top face 74 of the trunk lid 71, and run along a portion other than the position on which the vehicular part is to be mounted.

The invention is not limited to the first to seventh embodiments, various modifications such that the structure of the jig main body 2 of the first embodiment is conformed to that of the jig main body 29 of the second embodiment, and so on, are possible within the scope of the invention.

What is claimed is:

1. A positioning jig for a vehicular-part mounting hole for mounting a vehicular part to a vehicle, comprising:
   an engagement section which defines a jig main body with respect to said vehicle;
   an extending section which is so formed as to extend from said jig main body defined by said engagement section toward a mounting position where said vehicular part is to be mounted, and is provided with a forming mark for said vehicular-part mounting hole; and
   a positioning section protruding from said extending section and which positions said extending section to said vehicle.

2. The positioning jig according to claim 1, wherein said extending section has a second engagement section which defines a position of said extending section with respect to said vehicle.

3. The positioning jig according to claim 2, formed by folding a tabular member.

4. The positioning jig according to claim 1, formed by folding a tabular member.

5. The positioning jig according to claim 1, wherein said vehicular part is a rear under spoiler.

6. The positioning jig according to claim 1, wherein said engagement section is formed in a curved shape concaved from one end of said engagement section to an other end along shapes of back and bottom faces of a rear bumper of said vehicle.

7. The positioning jig according to claim 6,
   wherein said extending section has a flat portion, and is formed in such a manner as to extend along a width direction of said vehicle, and
   said flat portion closely contacts the bottom face of said rear bumper, structurally.

8. The positioning jig according to claim 1, wherein said positioning section has a step-correction piece that closely contacts a mount portion provided on a bottom face of a rear bumper of said vehicle, and a protrusion piece to be inserted into a bolt-insertion hole in said mount portion.

9. The positioning jig according to claim 1, wherein said positioning section has a positioning piece that closely contacts a contour of a mount portion provided on a bottom face of a rear bumper of said vehicle.

10. The positioning jig according to claim 1, wherein said positioning section has a positioning piece that closely contacts a contour of a rib for painting provided on a bottom face of a rear bumper of said vehicle.

11. The positioning jig according to claim 1, wherein said vehicular part is a rear spoiler.

12. The positioning jig according to claim 1, wherein said engagement section is formed in an approximately curved shape so as to match with a shape of a trunk lid of said vehicle from a rear face of said trunk lid to a top face thereof.

13. The positioning jig according to claim 1, wherein a foldable engagement piece is provided on a leading end of said extending section, and is engaged with a side-end portion of a trunk lid of said vehicle.

14. A positioning jig for a vehicular-part mounting hole for mounting a vehicular part to a vehicle, comprising:
   an engagement section which defines a jig main body with respect to said vehicle;
   an extending section which is so formed as to extend from said jig main body defined by said engagement section toward a mounting position where said vehicular part is to be mounted, and is provided with a forming mark for said vehicular-part mounting hole; and a positioning section which positions said extending section to said vehicle, wherein said engagement section defines said jig main body with respect to a height direction of said vehicle, and said extending section is so formed as to extend in a direction approximately orthogonal to said height direction defined by said engagement section.

15. The positioning jig according to claim 14, wherein said extending section has a second engagement section which defines a position of said extending section with respect to said vehicle.

16. The positioning jig according to claim 15, formed by folding a tabular member.

17. The positioning jig according to claim 14, formed by folding a tabular member.

* * * * *